US012181771B2

(12) United States Patent
Yonemoto et al.

(10) Patent No.: US 12,181,771 B2
(45) Date of Patent: Dec. 31, 2024

(54) TRANSMISSIVE LIQUID CRYSTAL DIFFRACTION ELEMENT

(71) Applicant: FUJIFILM Corporation, Tokyo (JP)

(72) Inventors: Takashi Yonemoto, Minamiashigara (JP); Yukito Saitoh, Minamiashigara (JP); Hiroshi Sato, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/192,498

(22) Filed: Mar. 29, 2023

(65) Prior Publication Data

US 2023/0244012 A1   Aug. 3, 2023

Related U.S. Application Data

(63) Continuation of application No. PCT/JP2021/032794, filed on Sep. 7, 2021.

(30) Foreign Application Priority Data

Sep. 30, 2020 (JP) ................... 2020-164850

(51) Int. Cl.
*G02F 1/29* (2006.01)
*G02B 5/18* (2006.01)
*G02B 5/30* (2006.01)

(52) U.S. Cl.
CPC ............ *G02F 1/292* (2013.01); *G02B 5/1828* (2013.01); *G02B 5/1833* (2013.01); *G02B 5/3016* (2013.01)

(58) Field of Classification Search
CPC .............. G02F 1/292; G02F 2201/305; G02B 5/1828; G02B 5/3016
See application file for complete search history.

(56) References Cited

U.S. PATENT DOCUMENTS

| 2010/0225876 | A1 | 9/2010 | Escuti et al. |
| 2021/0208316 | A1 | 7/2021 | Sato et al. |
| 2023/0205044 | A1* | 6/2023 | Sato ................. G02F 1/292 |
| | | | 349/202 |

FOREIGN PATENT DOCUMENTS

| JP | 2010-525394 A | 7/2010 |
| WO | WO 2020/066429 A1 | 4/2020 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/032794, dated Apr. 13, 2023.

(Continued)

*Primary Examiner* — Dung T Nguyen
(74) *Attorney, Agent, or Firm* — Birch, Stewart, Kolasch & Birch, LLP

(57) ABSTRACT

Provided is a transmissive liquid crystal diffraction element having a large diffraction angle and a high diffraction efficiency. The transmissive liquid crystal diffraction element includes a plurality of optically-anisotropic layers that are formed of a liquid crystal composition including a liquid crystal compound in a thickness direction, in which the optically-anisotropic layer has a liquid crystal alignment pattern in which a direction of an optical axis derived from the liquid crystal compound changes while continuously rotating in at least one in-plane direction, the one in-plane directions of the plurality of optically-anisotropic layers are parallel to each other, in two optically-anisotropic layers adjacent to each other among the plurality of optically-anisotropic layers, a rotation direction of the optical axis in the liquid crystal alignment pattern of one optically-anisotropic layer and a rotation direction of the optical axis in the liquid crystal alignment pattern of the other optically-anisotropic layer are opposite to each other, in cross-sectional (Continued)

images of the plurality of optically-anisotropic layers obtained by observing cross-sections taken in a thickness direction parallel to the one in-plane direction with a scanning electron microscope, the plurality of optically-anisotropic layers have bright portions and dark portions extending from one surface to another surface, and tilt angles of the dark portions of the plurality of optically-anisotropic layers change in order in the thickness direction.

9 Claims, 9 Drawing Sheets

(56) References Cited

OTHER PUBLICATIONS

International Search Report (Form PCT/ISA/210) for International Application No. PCT/JP2021/032794, dated Nov. 30, 2021, with English translation.
Japanese Office Action for corresponding Japanese Application No. 2022-553733, dated Jan. 30, 2024, with English translation.
Japanese Office Action dated Nov. 14, 2023 for corresponding Application No. 2022-553733 with an English translation.

* cited by examiner

→ D

TRANSMISSIVE LIQUID CRYSTAL DIFFRACTION ELEMENT

CROSS-REFERENCE TO RELATED APPLICATIONS

This application is a Continuation of PCT International Application No. PCT/JP2021/032794 filed on Sep. 7, 2021, which claims priority under 35 U.S.C. § 119(a) to Japanese Patent Application No. 2020-164850 filed on Sep. 30, 2020. The above applications are hereby expressly incorporated by reference, in its entirety, into the present application.

BACKGROUND OF THE INVENTION

1. Field of the Invention

The present invention relates to a transmissive liquid crystal diffraction element that diffracts incident light.

2. Description of the Related Art

An optical element that controls a direction of light is used in many optical devices or systems.

For example, the optical element that controls a direction of light is used in various optical devices that display a virtual image, various information, or the like to be superimposed on a backlight unit of a liquid crystal display device and a scene that is actually being seen, for example, a head mounted display (HMD) such as Augmented Reality (AR) glasses, a projector, a beam steering device, or a sensor for detecting a thing or measuring the distance to a thing.

As the optical element that controls a direction light, a transmissive liquid crystal diffraction element including an optically-anisotropic layer that is formed of a liquid crystal composition including a liquid crystal compound is disclosed.

JP2010-525394A discloses a polarization diffraction grating including a substrate and a first polarization diffraction grating layer on the substrate. The first polarization diffraction grating layer includes a molecular structure that is twisted according to a first twist sense over a first thickness defined between opposing faces of the first polarization diffraction grating layer. JP2010-525394A describes that the polarization diffraction grating layer can align liquid crystal molecules in a predetermined alignment pattern to diffract light.

SUMMARY OF THE INVENTION

Incidentally, a transmissive liquid crystal diffraction element that changes a liquid crystal alignment pattern in a plane to diffract light is expected to be applied as an optical member for various optical devices. However, in the transmissive liquid crystal diffraction element that changes the liquid crystal alignment pattern in a plane to diffract light, in order to increase the diffraction angle, the period of the liquid crystal alignment pattern in a plane needs to be reduced. In a case where the period of the liquid crystal alignment pattern is reduced, it is difficult to stably align the liquid crystal compound. Therefore, in the transmissive liquid crystal diffraction element, in a case where the diffraction angle increases, there is a problem in that the diffraction efficiency decreases, that is, the intensity of diffracted light is weakened.

An object of the present invention is to solve the above-described problem of the related art and to provide a transmissive liquid crystal diffraction element having a large diffraction angle and a high diffraction efficiency.

In order to achieve the object, the present invention has the following configurations.

[1] A transmissive liquid crystal diffraction element comprising:
  a plurality of optically-anisotropic layers that are formed of a liquid crystal composition including a liquid crystal compound in a thickness direction,
  in which the optically-anisotropic layer has a liquid crystal alignment pattern in which a direction of an optical axis derived from the liquid crystal compound changes while continuously rotating in at least one in-plane direction,
  the one in-plane directions of the plurality of optically-anisotropic layers are parallel to each other,
  in at least two optically-anisotropic layers adjacent to each other among the plurality of optically-anisotropic layers, a rotation direction of the optical axis in the liquid crystal alignment pattern of one optically-anisotropic layer and a rotation direction of the optical axis in the liquid crystal alignment pattern of the other optically-anisotropic layer are opposite to each other,
  in cross-sectional images of the plurality of optically-anisotropic layers obtained by observing cross-sections taken in a thickness direction parallel to the one in-plane direction with a scanning electron microscope, the plurality of optically-anisotropic layers have bright portions and dark portions extending from one surface to another surface, and
  tilt angles of the dark portions of the plurality of optically-anisotropic layers change in order in the thickness direction.

[2] The transmissive liquid crystal diffraction element according to [1],
  in which tilt directions of the dark portions of the plurality of optically-anisotropic layers are the same as each other.

[3] The transmissive liquid crystal diffraction element according to [1] or [2],
  in which the dark portions of the plurality of optically-anisotropic layers consist of dark portions perpendicular to a main surface of the optically-anisotropic layers and dark portions tilted in the one in-plane direction.

[4] The transmissive liquid crystal diffraction element according to any one of [1] to [3],
  in which the liquid crystal compound is a rod-like liquid crystal compound or a disk-like liquid crystal compound.

[5] The transmissive liquid crystal diffraction element according to any one of [1] to [4],
  in which at least one of the plurality of optically-anisotropic layers has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

[6] The transmissive liquid crystal diffraction element according to any one of [1] to [5],
  in which in at least one of the plurality of optically-anisotropic layers, the dark portion has one or more inflection points of angle.

[7] The transmissive liquid crystal diffraction element according to any one of [1] to [6], in which the liquid crystal alignment pattern of the optically-anisotropic layer is a concentric circular pattern having a concentric circular shape where the one in-plane direction in which the direction of the optical axis derived from the liquid crystal compound changes while continuously rotating moves from an inner side toward an outer side.

[8] The transmissive liquid crystal diffraction element according to any one of [1] to [7], in which in at least one of the plurality of optically-anisotropic layers, the tilt angles of the dark portions gradually change in the one in-plane direction.

According to an aspect of the present invention, a transmissive liquid crystal diffraction element having a large diffraction angle and a high diffraction efficiency can be provided.

DESCRIPTION OF THE PREFERRED EMBODIMENTS

Hereinafter, a transmissive liquid crystal diffraction element according to an embodiment of the present invention will be described in detail based on a preferred embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In the present specification, $Re(\lambda)$ represents an in-plane retardation at a wavelength $\lambda$. Unless specified otherwise, the wavelength $\lambda$ refers to 550 nm.

In the present specification, $Re(\lambda)$ is a value measured at the wavelength $\lambda$ using AxoScan (manufactured by Axometrics, Inc.). By inputting an average refractive index $((nx+ny+nz)/3)$ and a film thickness (d (μm)) to AxoScan, the following expressions can be calculated.

Slow Axis Direction (°)

$Re(\lambda)=R0(\lambda)$ is calculated.

$R0(\lambda)$ is expressed as a numerical value calculated by AxoScan and represents $Re(\lambda)$.

[Transmissive Liquid Crystal Diffraction Element]

The transmissive liquid crystal diffraction element according to the embodiment of the present invention comprises:

a plurality of optically-anisotropic layers that are formed of a liquid crystal composition including a liquid crystal compound in a thickness direction, in which the optically-anisotropic layer has a liquid crystal alignment pattern in which a direction of an optical axis derived from the liquid crystal compound changes while continuously rotating in at least one in-plane direction, the one in-plane directions of the plurality of optically-anisotropic layers are parallel to each other, in at least two optically-anisotropic layers adjacent to each other among the plurality of optically-anisotropic layers, a rotation direction of the optical axis in the liquid crystal alignment pattern of one optically-anisotropic layer and a rotation direction of the optical axis in the liquid crystal alignment pattern of the other optically-anisotropic layer are opposite to each other, in cross-sectional images of the plurality of optically-anisotropic layers obtained by observing cross-sections taken in a thickness direction parallel to the one in-plane direction with a scanning electron microscope, the plurality of optically-anisotropic layers have bright portions and dark portions extending from one surface to another surface, and tilt angles of the dark portions of the plurality of optically-anisotropic layers change in order in the thickness direction.

Figure 1:
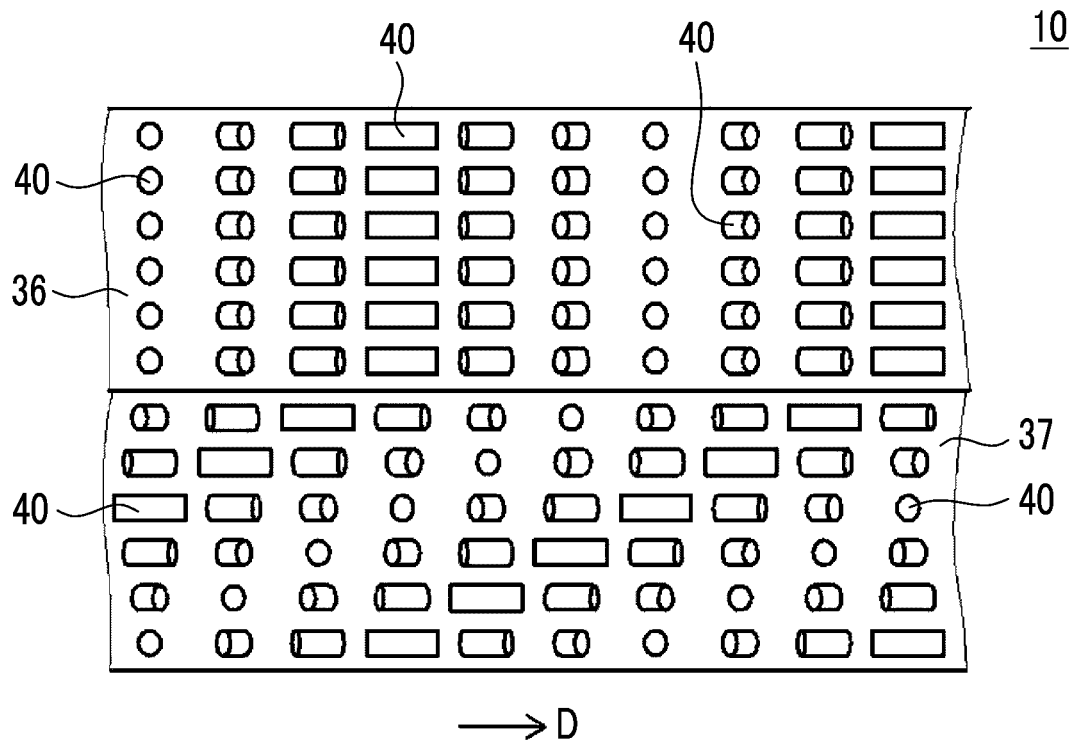
FIG. 1 is a diagram conceptually showing an example of a transmissive liquid crystal diffraction element according to the present invention.
Figure 2:
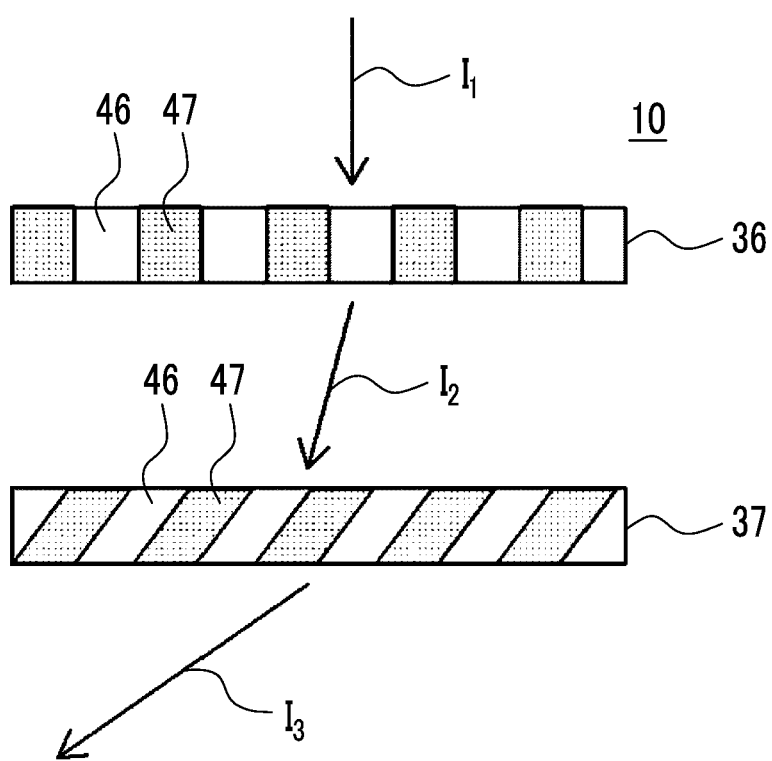
FIG. 2 is a diagram conceptually showing an SEM cross-sectional view of an optically-anisotropic layer in the transmissive liquid crystal diffraction element shown in FIG. 1.

FIG. 1 conceptually shows an example of the transmissive liquid crystal diffraction element according to the embodiment of the present invention. FIG. 2 is a diagram conceptually showing bright portions and dark portions observed due to a liquid crystal phase in a case where the transmissive liquid crystal diffraction element (optically-anisotropic layer) of FIG. 1 is observed with a scanning electron microscope (SEM).

A transmissive liquid crystal diffraction element 10 of FIGS. 1 and 2 includes an optically-anisotropic layer 36 and an optically-anisotropic layer 37 that are laminated in a thickness direction. The optically-anisotropic layer 36 and the optically-anisotropic layer 37 are formed of a liquid crystal composition including a liquid crystal compound 40, and have a predetermined liquid crystal alignment pattern in which an optical axis (not shown in the drawing; the same direction as a longitudinal direction of the liquid crystal compound 40) derived from the liquid crystal compound 40 changes while continuously rotating in at least one in-plane direction (refer to FIG. 12).

The optically-anisotropic layer 36 and the optically-anisotropic layer 37 have the above-described liquid crystal alignment pattern such that transmitted light can be diffracted. In this case, in a case where a length over which the direction of the optical axis derived from the liquid crystal compound 40 in the liquid crystal alignment pattern rotates by 180° in a plane is set as a single period, (hereinafter, also referred to as the single period of the liquid crystal alignment pattern), the diffraction angle depends on the length of the single period. Therefore, the diffraction angle can be adjusted by adjusting the single period of the liquid crystal alignment pattern. In addition, regarding the diffraction of the optically-anisotropic layer having the liquid crystal alignment pattern, a bending direction varies depending on polarized light. Specifically, left circularly polarized light and right circularly polarized light incident into the optically-anisotropic layer are bent in opposite directions. In addition, light transmitted through the optically-anisotropic layer is converted into circularly polarized light having an opposite turning direction.

An action the diffraction of the optically-anisotropic layer having the liquid crystal alignment pattern will be described below in detail.

In addition, the optically-anisotropic layer 36 has a structure in which the liquid crystal compounds 40 are laminated in the thickness direction and where optical axes of the liquid crystal compounds 40 laminated in the thickness direction are directed in the same direction. That is, in the optically-anisotropic layer 36, the liquid crystal compound 40 is not helically twisted and rotated in the thickness direction, and the liquid crystal compounds 40 at the same position in a plane direction are aligned such that the directions of the optical axes thereof are directed in the same direction.

In an SEM image of the optically-anisotropic layer, bright portions 46 and dark portions 47 are observed to connect the liquid crystal compounds 40 facing the same direction. Accordingly, in a case where the optically-anisotropic layer 36 having the above-described configuration is observed with an SEM, the bright portions 46 and the dark portions 47 are observed to be perpendicular to a main surface of the optically-anisotropic layer 36 as shown in FIG. 2.

On the other hand, in the optically-anisotropic layer 37, the liquid crystal compounds 40 laminated in the thickness direction are aligned to be twisted counterclockwise (to the left) from the upper side to the lower side in the drawing in the thickness direction. Accordingly, in a case where the optically-anisotropic layer 37 having the above-described configuration is observed with an SEM, the bright portions 46 and the dark portions 47 are observed to be tilted with respect to a main surface of the optically-anisotropic layer 37 as shown in FIG. 2. That is, in the optically-anisotropic layer 37, the liquid crystal compound is twisted and aligned to the degree to which it is not cholesterically aligned. For example, the twisted angle in the thickness direction is less than 360°.

Here, in the present invention, a direction of an arrangement axis D in the liquid crystal alignment pattern of the optically-anisotropic layer 36 and a direction of an arrangement axis D in the liquid crystal alignment pattern of the optically-anisotropic layer 37 are parallel to each other. In the example shown in FIG. 1, in the liquid crystal alignment patterns of the optically-anisotropic layer 36 and the optically-anisotropic layer 37, an optical axis derived from the liquid crystal compound changes while continuously rotating in a plane along the arrangement axis D in the left-right direction in the drawing.

In addition, in the present invention a rotation direction of the optical axis in the liquid crystal alignment pattern of the optically-anisotropic layer 36 and a rotation direction of the optical axis in the liquid crystal alignment pattern of the optically-anisotropic layer 37 are opposite to each other. In the example shown in FIG. 1, regarding the rotation direction of the optical axis derived from the liquid crystal compound in the arrow direction (right direction) of the arrangement axis D in a view from the top in the drawing, the optically-anisotropic layer 36 is left-rotating (counterclockwise), and the optically-anisotropic layer 37 is right-rotating (clockwise).

In the following description, the optically-anisotropic layer where the rotation direction of the optical axis in the liquid crystal alignment pattern is left-rotating is represented by reference numeral 36 (36a, 36b, . . . ), and the optically-anisotropic layer where the rotation direction of the optical axis in the liquid crystal alignment pattern is right-rotating is represented by reference numeral 37 (37a, 37b, . . . ). In addition, the optically-anisotropic layer where the rotation direction of the optical axis in the liquid crystal alignment pattern is left-rotating will also be simply referred to as "left-rotating optically-anisotropic layer", and the optically-anisotropic layer where the rotation direction of the optical axis in the liquid crystal alignment pattern is right-rotating will also be simply referred to as "right-rotating optically-anisotropic layer".

In addition, in the present invention, as shown in FIG. 2, in a cross-sectional image obtained by observing a cross-section taken in a thickness direction parallel to the one in-plane direction (arrangement axis D) with an SEM, each of the optically-anisotropic layer 36 and the optically-anisotropic layer 37 has the bright portions 46 and the dark portions 47 extending from one surface to another surface, and a tilt angle of the dark portions 47 in the optically-anisotropic layer 36 and a tilt angle of the dark portions 47 in the optically-anisotropic layer 37 are different from each other. In the example shown in FIG. 2, the dark portions 47 of the optically-anisotropic layer 36 are parallel (the tilt angle is 0°) to a line perpendicular to an interface between the optically-anisotropic layer 36 and the optically-anisotropic layer 37, and the dark portions 47 of the optically-anisotropic layer 37 are tilted at a predetermined angle.

An action of the transmissive liquid crystal diffraction element 10 having the above-described configuration will be described using FIG. 2.

As shown in FIG. 2, in a case where light $I_1$ is incident from a direction perpendicular to a main surface of the optically-anisotropic layer 36 on the optically-anisotropic layer 36 side, the light $I_1$ is bent by the optically-anisotropic layer 36 (light $I_2$). For example, in a case where the light $I_1$ is left circularly polarized light, the light $I_1$ is bent in the left direction in the drawing, and the bent light $I_2$ is converted into right circularly polarized light. The light $I_2$ bent by the optically-anisotropic layer 36 is incident into the optically-anisotropic layer 37.

Here, the rotation direction of the optical axis in the liquid crystal alignment pattern of the optically-anisotropic layer 37 and the rotation direction of the optical axis in the liquid crystal alignment pattern of the optically-anisotropic layer 36 are opposite to each other, and turning directions of incident circularly polarized light are opposite to each other. Therefore, the light $I_2$ is bent by the optically-anisotropic layer 37 in the same direction as the direction in which the light $I_1$ is bent by the optically-anisotropic layer 36 (light $I_3$). In addition, the bent light $I_3$ is converted into left circularly polarized light.

This way, the transmissive liquid crystal diffraction element diffracts light components incident into the optically-anisotropic layers in order in the same direction. Therefore, light can be diffracted at a large angle as the entire transmissive liquid crystal diffraction element.

Hereinabove, the transmissive liquid crystal diffraction element according to the embodiment of the present invention has been conceptually described.

The light (light $I_2$) bent by the optically-anisotropic layer 36 is in an intermediate state in the process of diffraction in the transmissive liquid crystal diffraction element, and the polarization state does not need to be circularly polarized light. That is, the optically-anisotropic layer 36 itself is not necessarily the transmissive liquid crystal diffraction element having a sufficient diffraction efficiency. In other words, the transmissive liquid crystal diffraction element according to the embodiment of the present invention is obtained by laminating a plurality of optically-anisotropic layers (in FIG. 2, the optically-anisotropic layer 36 and the optically-anisotropic layer 37).

As described above, in the transmissive liquid crystal diffraction element that changes the liquid crystal alignment pattern in a plane to diffract light, in order to increase the diffraction angle, the period of the liquid crystal alignment pattern in a plane needs to be reduced. In a case where the period of the liquid crystal alignment pattern is reduced, it is difficult to stably align the liquid crystal compound, and thus there is a problem in that the diffraction efficiency decreases.

On the other hand, as described above, the transmissive liquid crystal diffraction element according to the embodiment of the present invention includes the plurality of optically-anisotropic layers, and diffracts light components incident into the optically-anisotropic layers in order in the same direction. Therefore, light can be diffracted at a large angle as the entire transmissive liquid crystal diffraction element. Since the diffraction angle of each of the optically-anisotropic layers is not large, the period of the liquid crystal alignment pattern does not need to be reduced, and a decrease in diffraction efficiency can be suppressed.

The tilt angle of the dark portions 47 is determined depending on the angle of incident into the optically-anisotropic layer and the angle of light emitted from the optically-anisotropic layer. For example, as in the optically-anisotropic layer 37 shown in FIG. 2, in a case where light that is vertically incident into the main surface of the optically-anisotropic layer 36 is bent in the lower left direction in the drawing, the tilt angle of the dark portions 47 may be between 0° at which the tilt angle is parallel to the incidence light and an angle where the tilt angle is parallel to the emitted light. In addition, in a case where light incident into the main surface is further bent at a large angle and emitted as in the optically-anisotropic layer 37, the tilt angle of the dark portions 47 may be between an angle at which the tilt angle is parallel to the incidence light and an angle where the tilt angle is parallel to the emitted light. From the viewpoint of improving the diffraction efficiency, it is preferable that the tilt angle of the dark portions 47 is in the above-described range.

In the present invention, in the configuration, where the tilt angles of the dark portions of the optically-anisotropic layers change in order in the thickness direction, each of the optically-anisotropic layers can be diffracted with a high diffraction efficiency at the angle of the light incident into the optically-anisotropic layer. As a result, the diffraction efficiency of the entire transmissive liquid crystal diffraction element including the plurality of optically-anisotropic layers can be further improved.

Here, in the example shown in FIG. 1, the lengths of the single periods in the liquid crystal alignment patterns of the two optically-anisotropic layers are the same. However, the present invention is not limited to this configuration. In the two optically-anisotropic layers, the lengths of the single periods in the liquid crystal alignment patterns may be different from each other as long as the directions of the arrangement axes D are parallel to each other and the rotation directions of the optical axes are opposite to each other.

Figure 3:
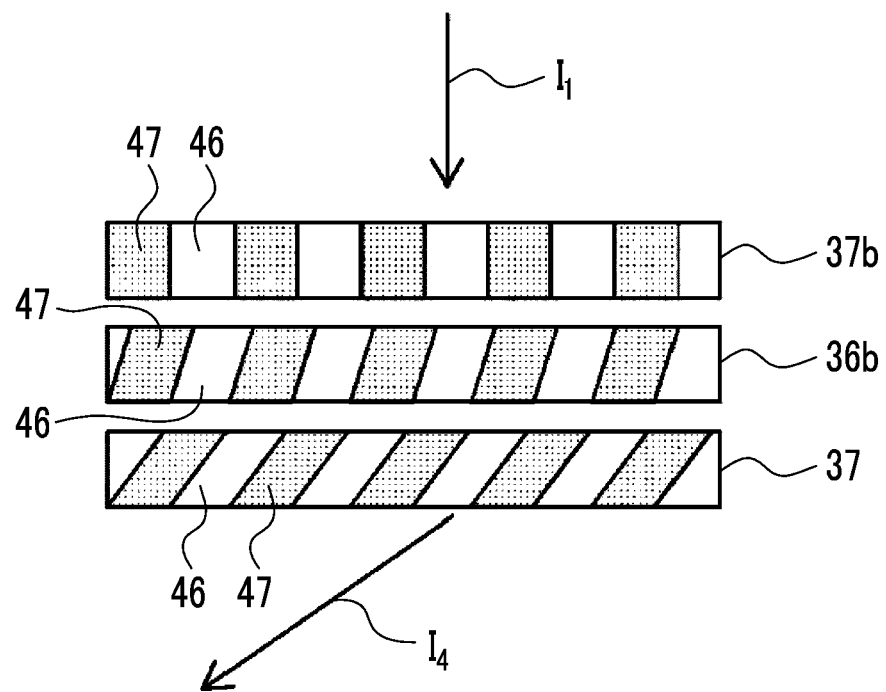
FIG. 3 is a diagram conceptually showing an SEM cross-sectional view of another example of the transmissive liquid crystal diffraction element according to the present invention.

In addition, in the examples shown in FIGS. 1 and 2, the transmissive liquid crystal diffraction element includes the two optically-anisotropic layers. However, the present invention is not limited to this configuration. As in the example shown in FIG. 3, the transmissive liquid crystal diffraction element may include three or more optically-anisotropic layers.

In a case where the transmissive liquid crystal diffraction element includes three or more optically-anisotropic layers, the tilt angles of the dark portions of the optically-anisotropic layers change in order of lamination of the optically-anisotropic layers. For example, in the example shown in FIG. 3, in a case where the tilt angle of the dark portions 47 of an upper optically-anisotropic layer 37b is represented by $\theta_1$, the tilt angle of the dark portions 47 of an intermediate optically-anisotropic layer 36b is represented by $\theta_2$, and the tilt angle of the dark portions 47 of the lower optically-anisotropic layer 37 is represented by $\theta_3$, $\theta_1 < \theta_2 < \theta_3$ is satisfied. The relationship between the tilt angles of the dark portions of the optically-anisotropic layers is not limited to this relationship, and may be $\theta_1 > \theta_2 > \theta_3$.

The tilt angle of the dark portions in the optically-anisotropic layer depends on the length of the single period of the liquid crystal alignment pattern and the pitch of twist in the thickness direction. Accordingly, in order to change the tilt angle of the dark portions of the optically-anisotropic layer, at least one of the length of the single period of the liquid crystal alignment pattern or the pitch of twist in the thickness direction may be adjusted. For example, in a case where the lengths of the single periods of the liquid crystal alignment patterns of the plurality of optically-anisotropic layers are the same, the pitch of twist in the thickness direction may be adjusted to change the tilt angle of the dark portions.

In addition, in the example shown in FIG. 2, the transmissive liquid crystal diffraction element 10 includes the optically-anisotropic layer 36 where the tilt angle of the dark portions 47 is 0°, that is, the dark portions 47 are not tilted and the optically-anisotropic layer 37 where the dark portions 47 are tilted at a predetermined angle. However, the present invention is not limited to this configuration.

Figure 4:
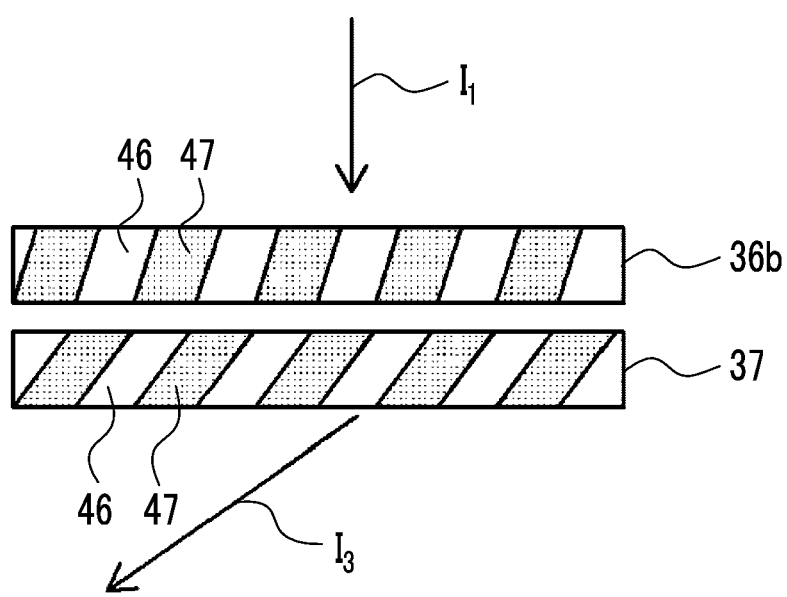
FIG. 4 is a diagram conceptually showing an SEM cross-sectional view of another example of the transmissive liquid crystal diffraction element according to the present invention.

For example, as in the example shown in FIG. 4, the transmissive liquid crystal diffraction element 10 may include a plurality of optically-anisotropic layers where the tilt angles of the dark portions are different from each other. In the example shown in FIG. 4, the dark portions 47 of each of the optically-anisotropic layer 36b and the optically-anisotropic layer 37 are tilted, and the tilt angle of the dark portions of the optically-anisotropic layer 37 is more than the tilt angle of the dark portions of the optically-anisotropic layer 36b.

The optically-anisotropic layer 37 is a right-rotating optically-anisotropic layer, in which the liquid crystal compounds 40 are aligned to be twisted counterclockwise (to the left) from the upper side to the lower side in the drawing in the thickness direction. On the other hand, the optically-anisotropic layer 36b is a left-rotating optically-anisotropic layer, in which the liquid crystal compounds 40 are aligned to be twisted clockwise (to the right) from the upper side to the lower side in the drawing in the thickness direction. As a result, a tilt direction of the dark portions 47 of the optically-anisotropic layer 37 and a tilt direction of the dark portions 47 of the optically-anisotropic layer 36b are the same.

In addition, in the example shown in FIG. 4, the tilt directions of the dark portions of the optically-anisotropic layers are the same as each other. However, the present invention is not limited to this configuration, and the transmissive liquid crystal diffraction element 10 may include optically-anisotropic layers where the tilt directions of the dark portions are different from each other. However, from the viewpoint of diffraction efficiency, it is preferable to adopt the configuration where the tilt directions of the dark portions of the optically-anisotropic layers are the same as each other or the configuration where the transmissive liquid crystal diffraction element 10 includes the optically-anisotropic layer where the tilt directions of the dark portions are the same as each other and the optically-anisotropic layer where the dark portions are not tilted (the dark portions are perpendicular to the main surface of the optically-anisotropic layer).

In addition, in the transmissive liquid crystal diffraction element according to the embodiment of the present invention, at least one of the optically-anisotropic layers may have a configuration where the dark portion has one or more inflection points of angle.

Figure 5:
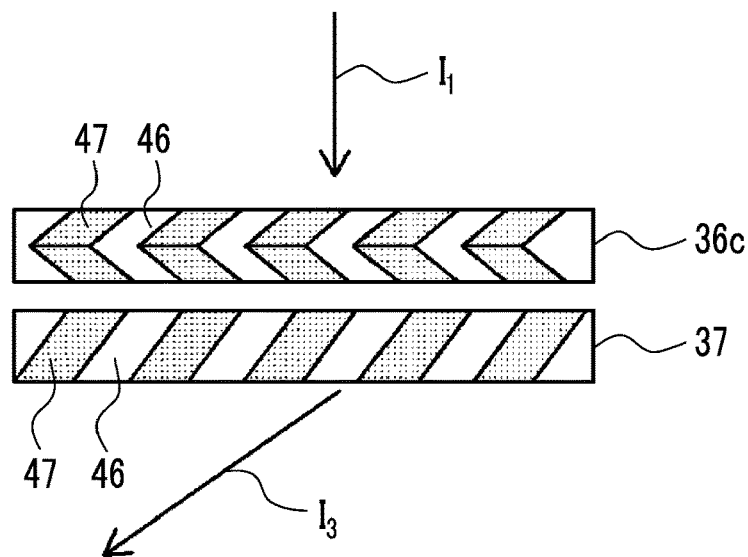
FIG. 5 is a diagram conceptually showing an SEM cross-sectional view of another example of the transmissive liquid crystal diffraction element according to the present invention.
Figure 6:
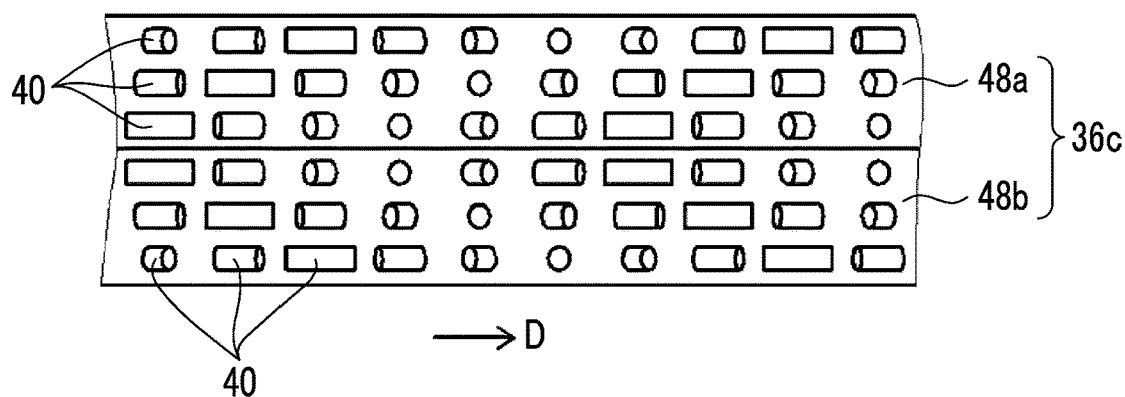
FIG. 6 is a diagram conceptually showing an optically-anisotropic layer in the transmissive liquid crystal diffraction element shown in FIG. 5.

FIG. 5 is a diagram conceptually showing another example of the transmissive liquid crystal diffraction element according to the embodiment of the present invention. FIG. 6 is a diagram conceptually showing the optically-anisotropic layer where the dark portion has inflection points of angle in the transmissive liquid crystal diffraction element of FIG. 5.

The transmissive liquid crystal diffraction element shown in FIG. 5 includes the right-rotating optically-anisotropic layer 37 and the left-rotating optically-anisotropic layer 36c.

Since the configuration of the optically-anisotropic layer 37 is the same as the configuration of the optically-anisotropic layer 37 shown in FIG. 1, the description thereof will not be made.

As shown in FIG. 5, in the optically-anisotropic layer 36c, the dark portion 47 has the inflection point of angle where the tilt angle changes. This way, the alignment state of the liquid crystal compound in the optically-anisotropic layer 36c where the dark portion 47 has inflection points of angle will be described using FIG. 6.

As shown in FIG. 6, in the optically-anisotropic layer 36c, at any position in the thickness direction, in a plane direction, the optical axis derived from the liquid crystal compound 40 rotates counterclockwise (to the left) in the arrangement axis D direction.

In addition, as shown in FIG. 6, in the optically-anisotropic layer 36c, in a lower region 48b in the thickness direction, the liquid crystal compound 40 is aligned to be twisted clockwise (to the right) from the upper side to the lower side in the drawing in the thickness direction.

On the other hand, in an upper region 48a in the thickness direction, the liquid crystal compound 40 is aligned to be twisted counterclockwise (to the left) from the upper side to the lower side in the drawing in the thickness direction.

That is, in the example shown in FIG. 6, the optically-anisotropic layer 36c has two regions where the in-plane liquid crystal alignment patterns are the same and the twisted states of the liquid crystal compounds 40 in the thickness direction are different from each other. As a result, in the optically-anisotropic layer 36c, as shown in FIG. 5, the dark portion 47 in the SEM image has one inflection point of angle.

In addition, in the example shown in FIG. 6, the thickness of the region 48a and the thickness of the region 48b are substantially the same, and the twisted angle of the liquid crystal compound 40 in the thickness direction in the region 48a and the twisted angle of the liquid crystal compound 40 in the thickness direction in the region 48b are substantially the same. Accordingly, in the dark portion 47 of the region 48a and the dark portion 47 of the region 48b, the tilt directions are opposite, and the tilt angles are the same. Accordingly, the average tilt angle of the dark portion 47 in the optically-anisotropic layer 36c is substantially 00.

This way, in a case where the dark portion of the optically-anisotropic layer has the inflection point of angle, the average value of the tilt angles of one dark portion in the thickness direction is the tilt angle of the dark portion of the optically-anisotropic layer. In the present invention, an average tilt angle of the dark portion can refer to an angle between a line segment and a line perpendicular to the main surface of the optically-anisotropic layer, the line segment connecting a point between the dark portion and one main surface of the optically-anisotropic layer and a point between the dark portion and another main surface of the optically-anisotropic layer.

The dark portion of the optically-anisotropic layer has the inflection point of angle such that a decrease in diffraction efficiency can be suppressed even in a case where the diffraction angle is large. In addition, a high diffraction efficiency can be maintained even for incidence light components having different wavelengths.

In addition, in the example shown in FIG. 5, one optically-anisotropic layer has the configuration in which the dark portion has the inflection point of angle. However, the present invention is not limited to this configuration. A plurality of optically-anisotropic layers may have a configuration where the dark portion has the inflection point of angle. In addition, in the example shown in FIG. 5, the dark portion in one optically-anisotropic layer has one inflection point of angle. However, the present invention is not limited to this configuration. The dark portion may have two or more inflection points of angle.

Figure 7:
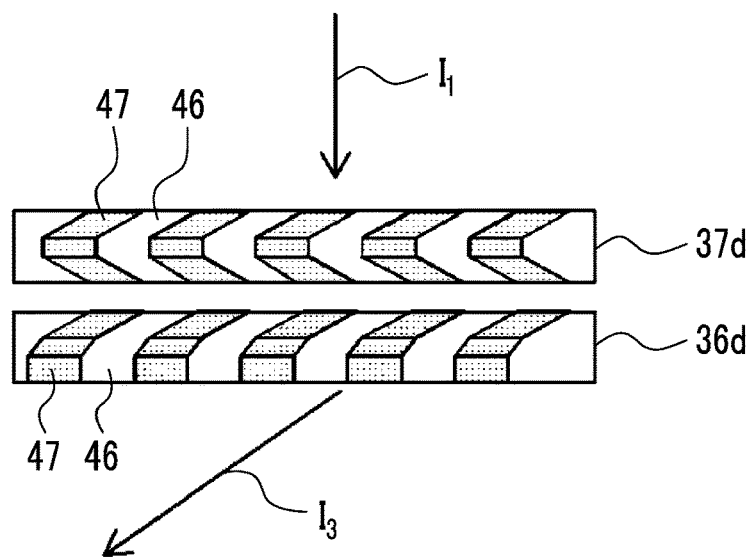
FIG. 7 is a diagram conceptually showing an SEM cross-sectional view of another example of the transmissive liquid crystal diffraction element according to the present invention.

For example, in the example shown in FIG. 7, the transmissive liquid crystal diffraction element includes a right-rotating optically-anisotropic layer 37d and a left-rotating optically-anisotropic layer 36d. In the optically-anisotropic layer 37d, the dark portion has two inflection points of angle. In addition, in the optically-anisotropic layer 36d, the dark portion has two inflection points of angle.

As shown in FIG. 7, in the optically-anisotropic layer 37d, the dark portion 47 has two inflection points of angle where the tilt angle changes. This way, the alignment state of the liquid crystal compound in the optically-anisotropic layer 37d where the dark portion 47 has the inflection points of angle will be described using FIG. 8.

Figure 8:
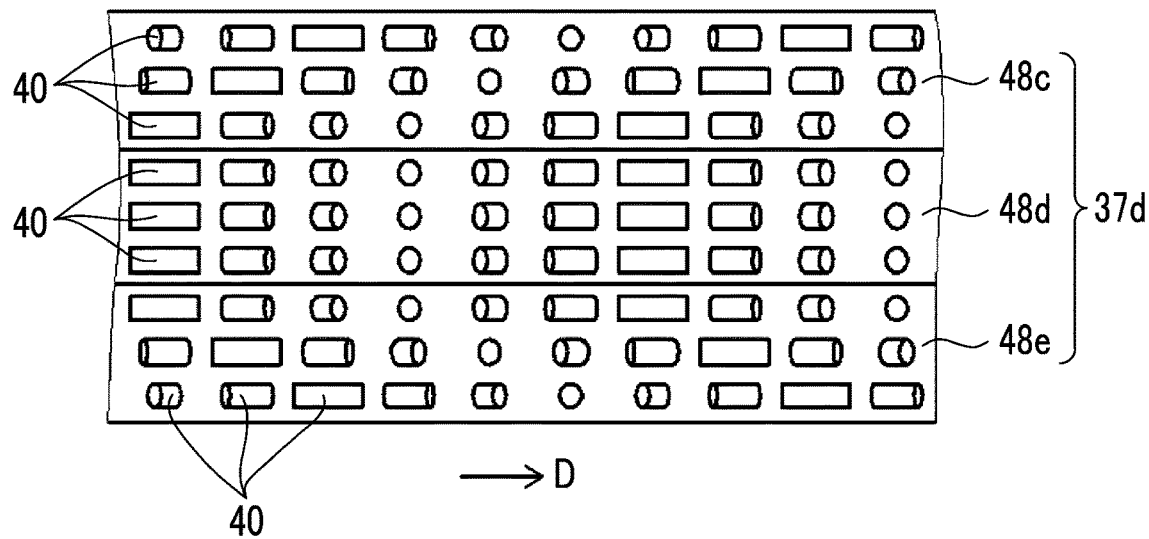
FIG. 8 is a diagram conceptually showing an optically-anisotropic layer in the transmissive liquid crystal diffraction element shown in FIG. 7.

As shown in FIG. 8, in the optically-anisotropic layer 37d, at any position in the thickness direction, in a plane direction, the optical axis derived from the liquid crystal compound 40 rotates clockwise (to the right) in the arrangement axis D direction.

In addition, as shown in FIG. 8, in the optically-anisotropic layer 37d, in a lower region 48e in the thickness direction, the liquid crystal compound 40 is aligned to be twisted counterclockwise (to the left) from the upper side to the lower side in the drawing in the thickness direction.

In addition, in a middle region 48d in the thickness direction, the liquid crystal compounds 40 are not twisted in the thickness direction, and the optical axes of the liquid crystal compounds 40 laminated in the thickness direction face the same direction. That is, it is preferable that the optical axes of the liquid crystal compounds 40 present at the same position in the plane direction face the same direction.

On the other hand, in an upper region 48c in the thickness direction, the liquid crystal compound 40 is aligned to be twisted clockwise (to the right) from the upper side to the lower side in the drawing in the thickness direction.

That is, in the example shown in FIG. 8, the optically-anisotropic layer 37d has three regions where the in-plane liquid crystal alignment patterns are the same and the twisted states of the liquid crystal compounds 40 in the thickness direction are different from each other. As a result, in the optically-anisotropic layer 37d, as shown in FIG. 7, the dark portion 47 in the SEM image has two inflection points of angle.

In addition, in the example shown in FIG. 8, the thickness of the region 48c and the thickness of the region 48e are substantially the same, and the twisted angle of the liquid crystal compound 40 in the thickness direction in the region 48c and the twisted angle of the liquid crystal compound 40 in the thickness direction in the region 48e are substantially the same. Accordingly, in the dark portion 47 of the region 48c and the dark portion 47 of the region 48e, the tilt directions are opposite, and the tilt angles are the same. In addition, in the region 48d, the liquid crystal compound 40 is not twisted in the thickness direction. Therefore, the dark portion 47 is not tilted. Accordingly, the average tilt angle of the dark portion 47 in the optically-anisotropic layer 37d is substantially 0°.

On the other hand, in the optically-anisotropic layer 36d, the dark portion 47 has two inflection points of angle where the tilt angle changes. Although not shown in the drawing, in the optically-anisotropic layer 36d, at any position in the thickness direction, in a plane direction, the optical axis derived from the liquid crystal compound 40 rotates counterclockwise (to the left) in the arrangement axis D direction.

In addition, the optically-anisotropic layer 36d includes the three regions in the thickness direction, and the twisted angles of the liquid crystal compounds in the thickness direction in the regions are different from each other. As a result, in the optically-anisotropic layer 36d, as shown in FIG. 7, the dark portion 47 in the SEM image has two inflection points of angle. The average tilt angle of the dark portion 47 in the optically-anisotropic layer 36d is a predetermined angle other than 0°. This way, the dark portion of the optically-anisotropic layer may have two or more inflection points of angle. In addition, the dark portion of each of the plurality of optically-anisotropic layers may have inflection points of angle.

In addition, in the present invention, at least one of the optically-anisotropic layers may have a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

Figure 9:
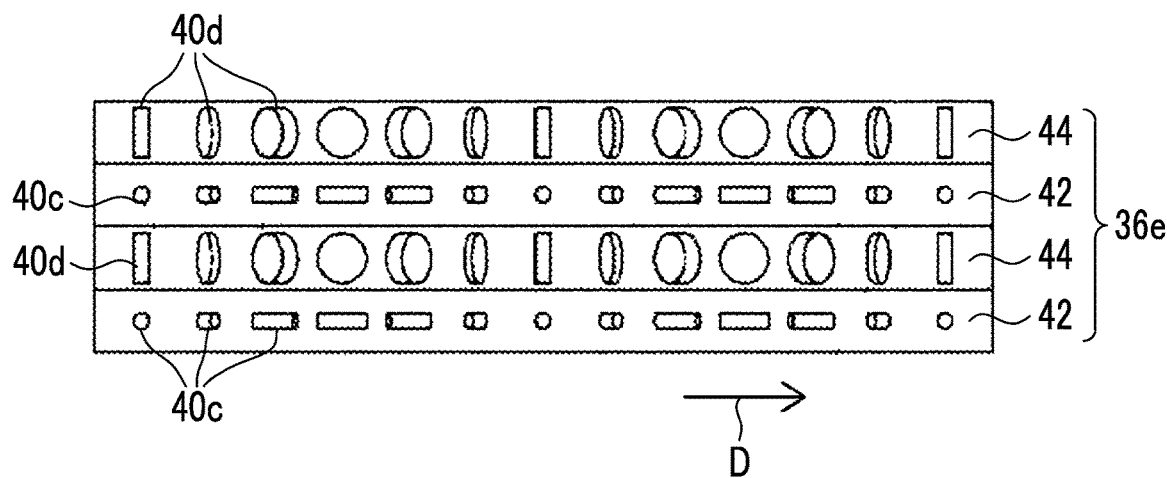
FIG. 9 is a diagram conceptually showing another example of the optically-anisotropic layer.

FIG. 9 is a diagram conceptually showing another example of the optically-anisotropic layer in the transmissive liquid crystal diffraction element according to the embodiment of the present invention.

An optically-anisotropic layer 36e shown in FIG. 9 includes four layers in total where a liquid crystal layer (hereinafter, also referred to as the rod-like liquid crystal layer) 42 that is formed of a rod-like liquid crystal compound 40c and a liquid crystal layer (hereinafter, also referred to as the disk-like liquid crystal layer) 44 that is formed of a disk-like liquid crystal compound 40d are alternately provided. In FIG. 9, in order to simplify the drawing to clearly show the configuration of the optically-anisotropic layer 36c, only the liquid crystal compounds on the surfaces of the rod-like liquid crystal layer 42 and the disk-like liquid crystal layer 44 are conceptually shown. However, each of the rod-like liquid crystal layer 42 and the disk-like liquid crystal layer 44 has a structure in which the liquid crystal compounds are laminated in the thickness direction and where optical axes of the liquid crystal compounds laminated in the thickness direction are directed in the same direction.

As in the optically-anisotropic layer 36 shown in FIG. 1, the rod-like liquid crystal layer 42 is a layer where the rod-like liquid crystal compound 40c is aligned in a liquid crystal alignment pattern in which a direction of an optical axis of the rod-like liquid crystal compound 40c changes while continuously rotating in at least one in-plane direction. In addition, as in the optically-anisotropic layer 36 shown in FIG. 1, the disk-like liquid crystal layer 44 is a layer where the disk-like liquid crystal compound 40d is aligned in a liquid crystal alignment pattern in which a direction of an optical axis of the disk-like liquid crystal compound 40d changes while continuously rotating in at least one in-plane direction. The direction of the optical axis of the rod-like liquid crystal compound 40c extends along a direction of a major axis. On the other hand, the direction of the optical axis of the disk-like liquid crystal compound 40d extends in a direction perpendicular to a disk plane. Accordingly, in the disk-like liquid crystal layer 44, the disk-like liquid crystal compound 40d is aligned such that the disk plane is perpendicular to an interface of the disk-like liquid crystal layer 44.

In one optically-anisotropic layer 36e, in the rod-like liquid crystal layer 42 and the disk-like liquid crystal layer 44, the single periods of the liquid crystal alignment patterns are the same, and the rotation directions of the optical axes in the liquid crystal alignment patterns are the same. Accordingly, in the example shown in FIG. 9, the two rod-like liquid crystal layers 42 and the two disk-like liquid crystal layers 44 exhibit the same action of the optically-anisotropic layer 36 as one optically-anisotropic layer 36e.

In a case where the optically-anisotropic layer has the configuration in which the rod-like liquid crystal layer 42 and the disk-like liquid crystal layer 44 are alternately laminated, the thickness direction retardation Rth of the optically-anisotropic layer can be approximated to zero. As a result, in a case where light is incident into the optically-anisotropic layer from an oblique direction, a change in the in-plane retardation Re is small. Therefore, the incidence angle dependence of the diffraction performance such as the diffraction efficiency can be improved.

In addition, diffracted light is produced in various places in the thickness direction of a layer that causes diffraction to occur. Therefore, it is preferable that Rth is close to zero in any place in the thickness direction of the layer that causes diffraction to occur. It is preferable that Rth is offset in each of the places in the thickness direction of the layer that causes diffraction to occur. Accordingly, the Rths of the rod-like liquid crystal layer and the disk-like liquid crystal layer that are alternately laminated have a positive and negative relationship with the Rth of a layer adjacent thereto, and an absolute value of the Rth of each of the layers is preferably about 10 to 200 nm.

By providing the above-described optically-anisotropic layer, the diffraction efficiency of the transmissive liquid crystal diffraction element can be further improved.

Here, the thickness of each of the rod-like liquid crystal layer 42 and the disk-like liquid crystal layer 44 is preferably 0.1 μm to 5 μm, more preferably 0.1 μm to 2 μm, and still more preferably 0.1 μm to 0.5 μm. It is preferable that the total thickness of the rod-like liquid crystal layer 42 and the disk-like liquid crystal layer 44 is not excessively large with respect to the wavelength of incident light.

In the example shown in FIG. 9, the configuration in which the two rod-like liquid crystal layers 42 and the two disk-like liquid crystal layer 44 are provided, but the present invention is not limited to this configuration. A configuration in which one rod-like liquid crystal layer 42 and one disk-like liquid crystal layer 44 are provided may be adopted or a configuration in which three or more rod-like liquid crystal layers 42 and three or more disk-like liquid crystal layers 44 are provided may be adopted.

By providing a plurality of rod-like liquid crystal layers 42 and a plurality of disk-like liquid crystal layers 44 and matching the sizes of the retardations $\Delta n \times d$ ($\Delta n$ represents a difference in refractive index of the liquid crystal compound, and d represents the thickness of the liquid crystal layer) of the rod-like liquid crystal layers 42 and the disk-like liquid crystal layers 44 to each other, the thickness direction retardation Rth of the optically-anisotropic layer can be approximated to zero.

In addition, by changing the values of $\Delta n$ and the thickness d of the rod-like liquid crystal layers and the disk-like liquid crystal layers, the value of Rth of the optically-anisotropic layer can be accurately controlled. In this configuration, $Rth=((ne+no)/2-no) \times d=(ne \times no)/2 \times d$. Therefore, in the rod-like liquid crystal layer, ne>no, and thus Rth>0. In the disk-like liquid crystal layer, ne<no, and thus Rth<0. In the present invention, the rod-like liquid crystal layer and the disk-like liquid crystal layer can be alternately laminated, and the proportion thereof can be changed. Therefore, the value of Rth can be accurately controlled between the value obtained in a case where all of the liquid crystal layers are the rod-like liquid crystal layers and the value obtained in a case where all of the liquid crystal layers are the disk-like liquid crystal layers.

As shown in FIG. 9, it is preferable that the rod-like liquid crystal compound 40c is aligned in a state where the optical axis (director) is parallel to an interface of the rod-like liquid crystal layer 42, and the disk-like liquid crystal compound 40d is aligned in a state where the disk plane is perpendicular to an interface of the disk-like liquid crystal layer 44. As a result, by averaging the refractive indices in the thickness direction of the disk-like liquid crystal compound and the rod-like liquid crystal compound while continuously maintaining a change of the slow axis in the thickness direction in a plane, the thickness direction retardation Rth can be approximated to zero, and the incidence angle dependence can be further improved.

Here, even in a case where the liquid crystal compound 40 of the optically-anisotropic layer is twisted in the thickness direction, the optically-anisotropic layer has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

Figure 10:
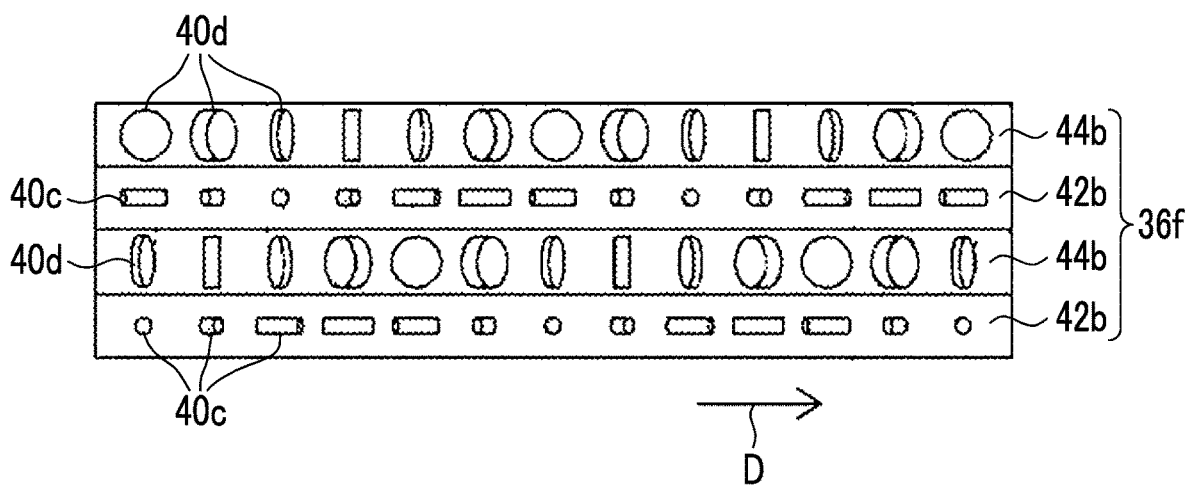
FIG. 10 is a diagram conceptually showing another example of the optically-anisotropic layer.

FIG. 10 is a diagram conceptually showing another example of the optically-anisotropic layer in the transmissive liquid crystal diffraction element according to the embodiment of the present invention.

An optically-anisotropic layer 36f shown in FIG. 10 includes four layers in total where a rod-like liquid crystal layer 42b that is formed of the rod-like liquid crystal compound 40c and a disk-like liquid crystal layer 44b that is formed of the disk-like liquid crystal compound 40d are alternately provided. In FIG. 10, in order to simplify the drawing to clearly show the configuration of the optically-anisotropic layer 36f, only the liquid crystal compounds on the surfaces of the rod-like liquid crystal layer 42b and the disk-like liquid crystal layer 44b are conceptually shown. However, the rod-like liquid crystal layer 42b and the disk-like liquid crystal layer 44b have a structure in which the liquid crystal compound is laminated in the thickness direction.

As in the optically-anisotropic layer 36 shown in FIG. 1, the rod-like liquid crystal layer 42b is a layer where the rod-like liquid crystal compound 40c is aligned in a liquid crystal alignment pattern in which a direction of an optical axis of the rod-like liquid crystal compound 40c changes while continuously rotating in at least one in-plane direction. In addition, as in the optically-anisotropic layer 36 shown in FIG. 1, the disk-like liquid crystal layer 44b is a layer where the disk-like liquid crystal compound 40d is aligned in a liquid crystal alignment pattern in which a direction of an optical axis of the disk-like liquid crystal compound 40d changes while continuously rotating in at least one in-plane direction.

In the optically-anisotropic layer 36f, in the rod-like liquid crystal layer 42b and the disk-like liquid crystal layer 44b, the single periods of the liquid crystal alignment patterns are the same, and the rotation directions of the optical axes in the liquid crystal alignment patterns are the same.

Here, in the example shown in FIG. 10, a longitudinal direction of the liquid crystal compound in a plane is integrally twisted and aligned in the thickness direction from the lower rod-like liquid crystal layer 42b to the upper disk-like liquid crystal layer 44b in the drawing. As a result, the two rod-like liquid crystal layers 42b and the two disk-like liquid crystal layers 44b exhibit the same action of the optically-anisotropic layer 36 as one optically-anisotropic layer 36f. The longitudinal direction of the liquid crystal compound in the disk-like liquid crystal layer 44b is a longitudinal direction of a shape in which the disk-like liquid crystal compound is projected on the surface (interface) of the disk-like liquid crystal layer.

This way, in a case where the liquid crystal compound 40 of the optically-anisotropic layer is twisted in the thickness direction, the rod-like liquid crystal layer and the disk-like liquid crystal layer are laminated such that the incidence angle dependence of the diffraction performance such as the diffraction efficiency can be further improved.

The thicknesses and the like of the rod-like liquid crystal layer 42b and the disk-like liquid crystal layer 44b are the same as those of the rod-like liquid crystal layer 42 and the disk-like liquid crystal layer 44.

Next, the configuration of the optically-anisotropic layer will be described in detail using FIGS. 11 and 12. The optically-anisotropic layer 37 is described using FIG. 11 and has the same configuration as, for example, the optically-anisotropic layer 36 shown in FIG. 1, except that the liquid crystal compound is not twisted and aligned in the thickness direction and the rotation directions of the optical axes in the liquid crystal alignment patterns are opposite to each other.

Figure 11:
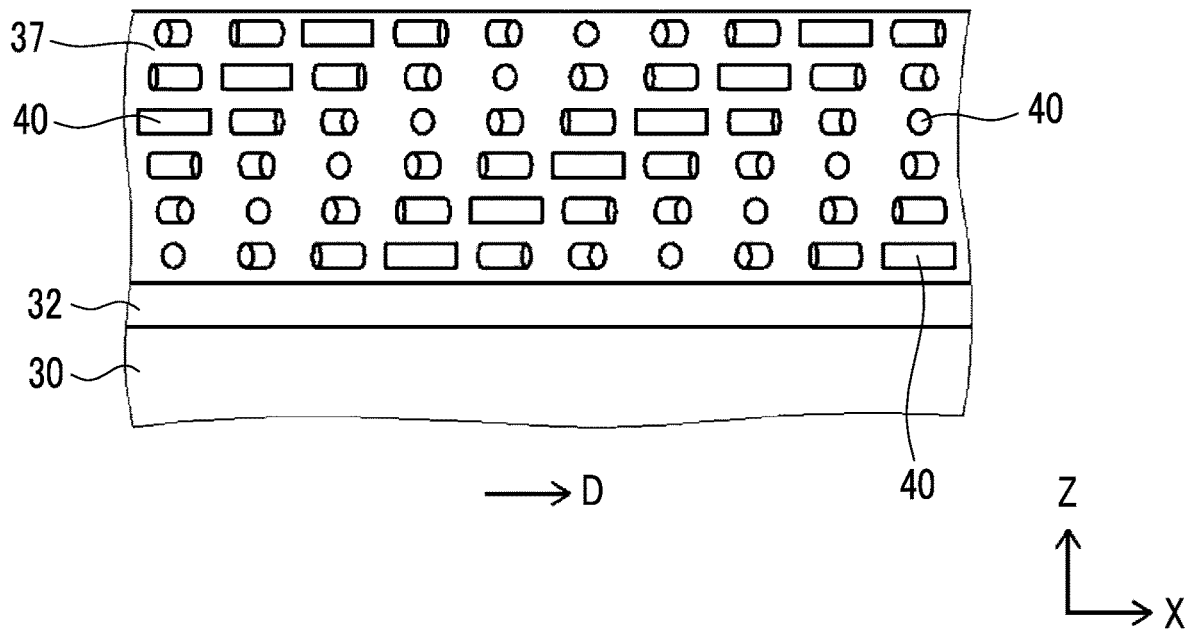
FIG. 11 is a diagram conceptually showing one example of the optically-anisotropic layer in the transmissive liquid crystal diffraction element shown in FIG. 1.
Figure 12:
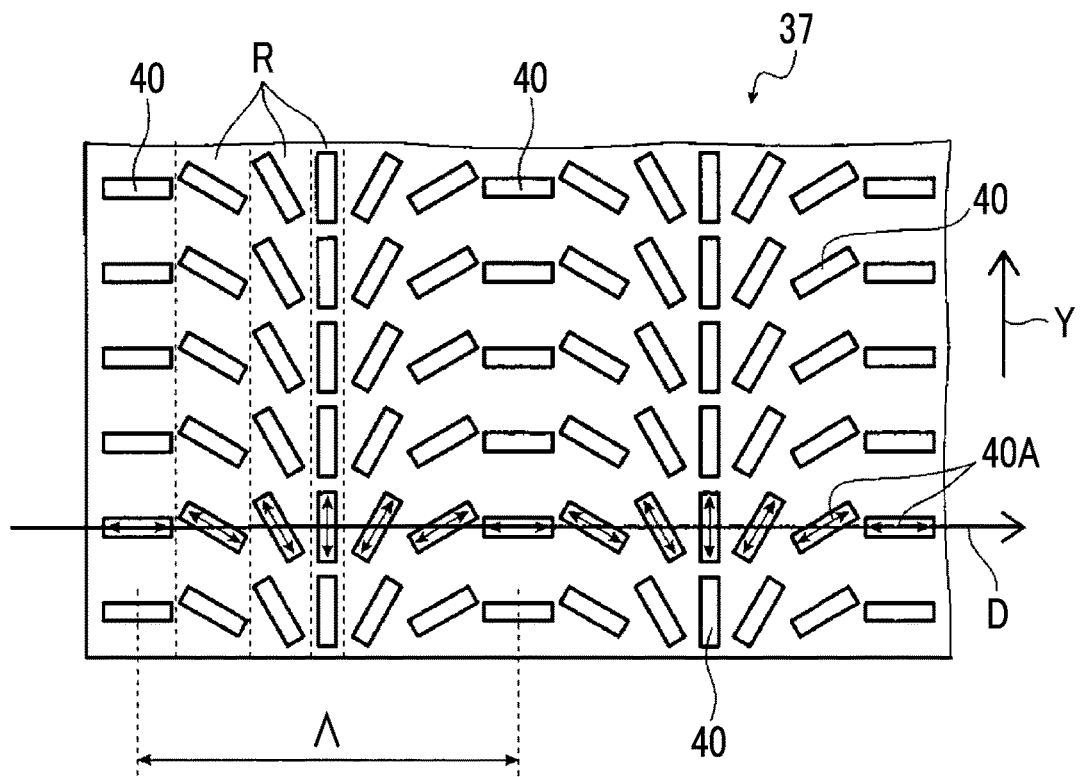
FIG. 12 is a plan view showing the optically-anisotropic layer shown in FIG. 11.

The optically-anisotropic layer 37 shown in FIGS. 11 and 12 is formed by immobilizing a liquid crystal phase where a liquid crystal compound is aligned and has a liquid crystal alignment pattern in which a direction of an optical axis derived from the liquid crystal compound changes while continuously rotating in at least one in-plane direction. In the optically-anisotropic layer 37 of the example shown in FIGS. 11 and 12, the rotation direction of the optical axis in the liquid crystal alignment pattern is right-rotating (clockwise) in the arrangement axis D direction.

In addition, the optically-anisotropic layer 37 shown in FIG. 11 has a twisted structure in which the liquid crystal compound 40 is turned and laminated in the thickness direction, and a total rotation angle between the liquid crystal compound 40 present on one main surface side of the optically-anisotropic layer 37 and the liquid crystal compound 40 present on another main surface side of the optically-anisotropic layer 37 is less than 360°.

In the example shown in FIG. 11, the optically-anisotropic layer 37 is laminated on an alignment film 32 that is laminated on a support 30.

In a case where the plurality of optically-anisotropic layers are laminated as the transmissive liquid crystal diffraction element, as in the example shown in FIG. 11, the optically-anisotropic layers may be laminated in a state where they are laminated on the support 30 and the alignment film 32. Alternatively, the optically-anisotropic layers may be laminated, for example, in a state where only the alignment film 32 and the optically-anisotropic layers are laminated after peeling off the support 30. Alternatively, the optically-anisotropic layers may be laminated, for example, in a state where only the optically-anisotropic layers are laminated after peeling off the support 30 and the alignment film 32.

<Support>

The support 30 supports the alignment film 32 and the optically-anisotropic layer 37.

As the support 30, various sheet-shaped materials (films or plate-shaped materials) can be used as long as they can support the alignment film 32 and the optically-anisotropic layer 37.

A transmittance of the support 30 with respect to light to be diffracted is preferably 50% or higher, more preferably 70% or higher, and still more preferably 85% or higher.

The thickness of the support 30 is not particularly limited and may be appropriately set depending on the use of the transmissive liquid crystal diffraction element, a material for forming the support 30, and the like in a range where the alignment film 32 and the optically-anisotropic layer 37 can be supported.

The thickness of the support 30 is preferably 1 to 1000 μm, more preferably 3 to 250 μm, and still more preferably 5 to 150 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

The alignment film 32 is formed on the surface of the support 30.

The alignment film 32 is an alignment film for aligning the liquid crystal compound 40 to the predetermined liquid crystal alignment pattern during the formation of the optically-anisotropic layer 37.

As described above, in the present invention, the optically-anisotropic layer 37 has a liquid crystal alignment pattern in which a direction of an optical axis 40A (refer to FIG. 12) derived from the liquid crystal compound 40 changes while continuously rotating in one in-plane direction. Accordingly, the alignment film 32 is formed such that the optically-anisotropic layer 36 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as w-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or alignment films described in JP2005-097377A, JP2005-099228A, and JP2005-128503A is preferable.

In the optically-anisotropic layer, the alignment film 32 can be suitably used as a so-called photo-alignment film obtained by irradiating a photo-alignment material with polarized light or non-polarized light. That is, in the optically-anisotropic layer, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 13:
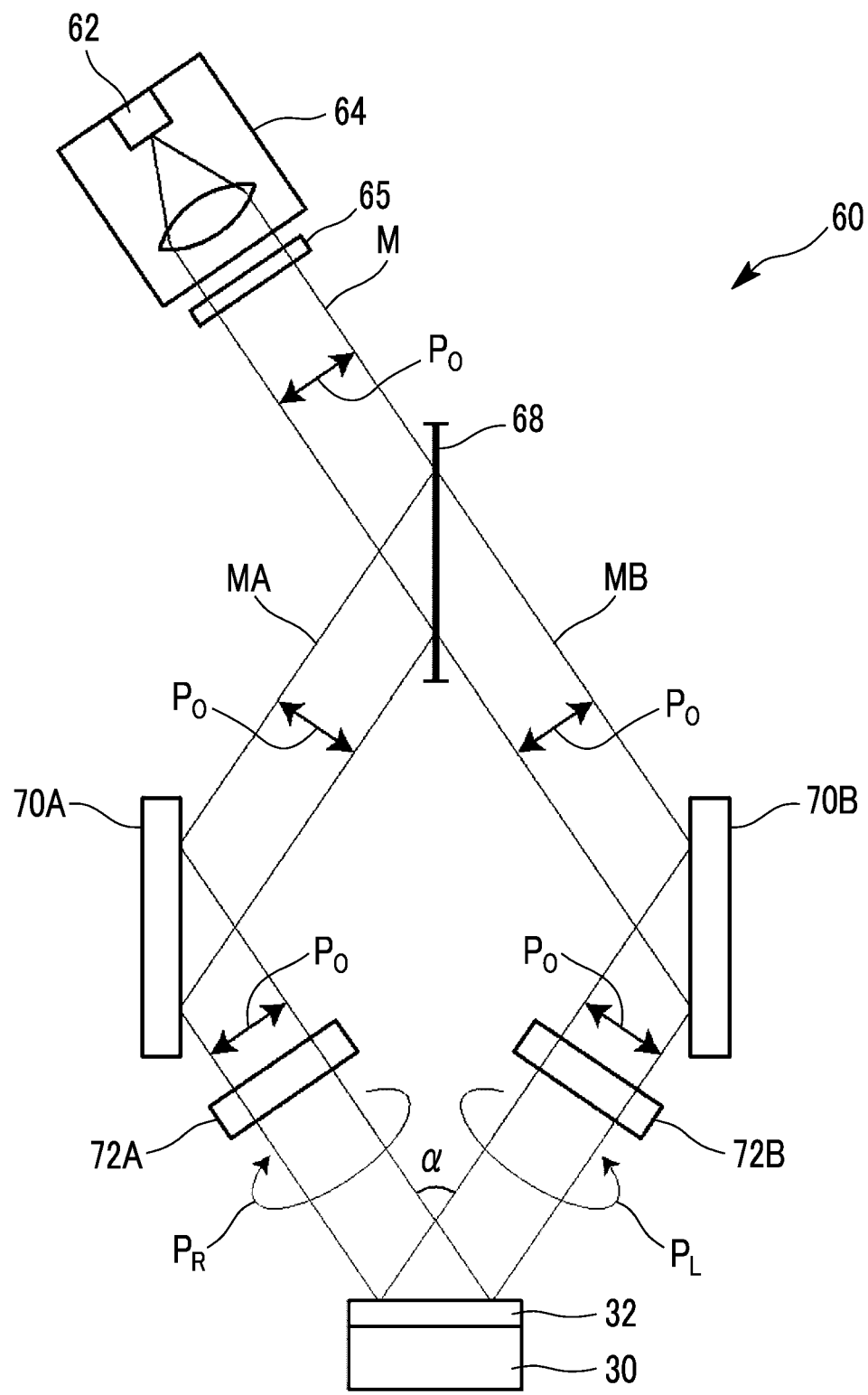
FIG. 13 is a diagram conceptually showing one example of an exposure device that exposes an alignment film forming the optically-anisotropic layer shown in FIG. 12.

FIG. 13 conceptually shows an example of an exposure device that exposes the alignment film 32 to form an alignment pattern.

An exposure device 60 shown in FIG. 13 includes: a light source 64 including a laser 62; a λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and μ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the optically-anisotropic layer on the alignment film 32 having the alignment pattern in which the alignment state periodically changes, as described below, the optically-anisotropic layer 36 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the optically-anisotropic layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the optically-anisotropic layer has the liquid crystal alignment pattern in which the direction of the optical axis 40A derived from the liquid crystal compound 40 changes while continuously rotating in at least one in-plane direction. That is, in the present invention, the support 30 may be made to act as the alignment film.

<Optically-Anisotropic Layer>

The optically-anisotropic layer 37 is formed on a surface of the alignment film 32.

As described above, the optically-anisotropic layer 37 is formed by immobilizing a liquid crystal phase where a liquid crystal compound is aligned and has a liquid crystal alignment pattern in which a direction of an optical axis derived from the liquid crystal compound changes while continuously rotating in at least one in-plane direction.

In addition, in the optically-anisotropic layer 37, as conceptually shown in FIG. 11, the liquid crystal compound 40 is helically twisted and rotated in the thickness direction.

<<Method of Forming Optically-Anisotropic Layer>>

The optically-anisotropic layer can be formed by immobilizing a liquid crystal phase in a layer shape, the liquid crystal phase being aligned in a liquid crystal alignment pattern in which a direction of an optical axis derived from the liquid crystal compound changes while continuously rotating in at least one in-plane direction.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by aligning the polymerizable liquid crystal compound in the liquid crystal alignment pattern, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the optically-anisotropic layer does not necessarily exhibit liquid crystallinity. For example, the molecular weight of the polymerizable liquid crystal compound may be increased by a curing reaction such that the liquid crystallinity thereof is lost.

Examples of a material used for forming the optically-anisotropic layer obtained by immobilizing a liquid crystal phase include a liquid crystal composition including a liquid crystal compound. It is preferable that the liquid crystal compound is a polymerizable liquid crystal compound.

In addition, the liquid crystal composition used for forming the optically-anisotropic layer may further include a surfactant and a polymerization initiator.

—Polymerizable Liquid Crystal Compound—

The polymerizable liquid crystal compound may be a rod-like liquid crystal compound or a disk-like liquid crystal compound.

Examples of the rod-like polymerizable liquid crystal compound for forming an optically-anisotropic layer include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The liquid crystal composition used for forming the optically-anisotropic layer may include a surfactant.

It is preferable that the surfactant is a compound that can function as an alignment control agent contributing to the stable or rapid alignment of the liquid crystal compound. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

In order for the optically-anisotropic layer to have the configuration where the liquid crystal compound is twisted and aligned in the thickness direction, the liquid crystal composition for forming the optically-anisotropic layer may contain a chiral agent.

—Chiral Agent (Optically Active Compound)—

The chiral agent (optically active compound) has a function of inducing a helical structure of a liquid crystal phase. The chiral agent may be selected depending on the purposes because a helical twisted direction and a helical twisting power (HTP) to be induced vary depending on compounds.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a desired twisted alignment corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

It is preferable that the liquid crystal composition is used as a liquid during the formation of the optically-anisotropic layer.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the optically-anisotropic layer is formed, it is preferable that the optically-anisotropic layer is formed by applying the liquid crystal composition to a surface where the optically-anisotropic layer is to be formed, aligning the liquid crystal compound to a state the liquid crystal phase aligned in the predetermined liquid crystal alignment pattern, and curing the liquid crystal compound.

That is, in a case where the optically-anisotropic layer is formed on the alignment film 32, it is preferable that the optically-anisotropic layer obtained by immobilizing a liquid crystal phase is formed by applying the liquid crystal composition to the alignment film 32, aligning the liquid crystal compound in the predetermined liquid crystal alignment pattern, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the optically-anisotropic layer. In the drying and/or heating step, the liquid crystal compound in the liquid crystal composition only has to be aligned in the predetermined liquid crystal alignment pattern. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the optically-anisotropic layer is not particularly limited, and the thickness with which a required light reflectivity can be obtained may be appropriately set depending on the use of the optically-anisotropic layer, the light reflectivity required for the optically-anisotropic layer, the material for forming the optically-anisotropic layer, and the like.

In addition, in a case where the optically-anisotropic layer has the configuration in which the dark portion has one or more inflection points and the optically-anisotropic layer has the regions where the tilt directions of the dark portions in the thickness direction are different from each other, the optically-anisotropic layer may be formed using liquid crystal compositions having different formulas depending on the regions in the thickness direction.

For example, in a case where the optically-anisotropic layer 36c shown in FIG. 6 is formed, first, a liquid crystal composition including a chiral agent that induces right-twisting in the thickness direction is applied to the patterned alignment film that is formed on the support, and subsequently the liquid crystal composition is cured to form the region 48b. Next, a liquid crystal composition including a chiral agent that induces left-twisting in the thickness direction is applied to the formed region 48b, and subsequently the liquid crystal composition is cured to form the region 48a. Next, in a case where the liquid crystal composition is applied to the region 48b, the liquid crystal compounds 40 in the liquid crystal composition are arranged according to the arrangement of the liquid crystal compounds 40 present in the surface of the region 48b. Therefore, even in the region 48a, the liquid crystal alignment pattern where the single period Λ gradually changes in the arrangement axis D direction is formed.

By forming the plurality of regions where the twisted states of the liquid crystal compounds 40 the thickness direction are different from each other as described above, the optically-anisotropic layer where the dark portion 47 has one or more inflection points of angle can be formed.

<<Liquid Crystal Alignment Pattern of Optically-Anisotropic Layer>>

As described above, the optically-anisotropic layer has the liquid crystal alignment pattern in which the direction of the optical axis 40A derived from the liquid crystal compound 40 changes while continuously rotating in the one in-plane direction in a plane of the optically-anisotropic layer.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is parallel to a rod-like major axis direction. In the following description, the optical axis 40A derived from the liquid crystal compound 40 will also be referred to as "the optical axis 40A of the liquid crystal compound 40" or "the optical axis 40A".

FIG. 12 conceptually shows a plan view of the optically-anisotropic layer 37.

The plan view is a view in a case where the optically-anisotropic layer is seen from the top in FIG. 11, that is, a view in a case where the optically-anisotropic layer is seen from a thickness direction (laminating direction of the respective layers (films)).

In addition, in FIG. 12, in order to easily understand the configuration of the optically-anisotropic layer (optically-anisotropic layer 37), only the liquid crystal compound 40 on the surface of the alignment film 32 is shown.

As shown in FIG. 12, on the surface of the alignment film 32, the liquid crystal compound 40 forming the optically-anisotropic layer 37 has the liquid crystal alignment pattern in which the direction of the optical axis 40A changes while continuously rotating in the predetermined one in-plane direction indicated by arrow D (hereinafter, referred to as the arrangement axis D) in a plane of the optically-anisotropic layer according to the alignment pattern formed on the alignment film 32 as the lower layer. In the example shown in the drawing, the liquid crystal compound 40 has the liquid crystal alignment pattern in which the optical axis 40A of the liquid crystal compound 40 changes while continuously rotating clockwise in the arrangement axis D direction.

The liquid crystal compound 40 forming the optically-anisotropic layer 37 is two-dimensionally arranged in a direction perpendicular to the arrangement axis D and the one in-plane direction (arrangement axis D direction).

In the following description, the direction perpendicular to the arrangement axis D direction will be referred to as "Y direction" for convenience of description. That is, the arrow Y direction is a direction perpendicular to the one in-plane direction in which the direction of the optical axis 40A of the liquid crystal compound 40 changes while continuously rotating in a plane of the optically-anisotropic layer. Accordingly, in FIGS. 1 and 11 and FIGS. 14 and 15 described below, the Y direction is a direction perpendicular to the paper plane.

Specifically, "the direction of the optical axis 40A of the liquid crystal compound 40 changes while continuously rotating in the arrangement axis D direction (the predetermined one in-plane direction)" represents that an angle between the optical axis 40A of the liquid crystal compound 40, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ-180° in the arrangement axis D direction. A difference between the angles of the optical axes 40A of the liquid crystal compounds 40 adjacent to each other in the arrangement axis D direction is preferably 450 or less, more preferably 150 or less, and still more preferably less than 15°.

In addition, in the present invention, the liquid crystal compound rotates in the direction in which an angle between the optical axes 40A of the liquid crystal compounds 40 adjacent to each other in the arrangement axis D direction decreases. Accordingly, in the optically-anisotropic layer shown in FIGS. 11 and 12, the optical axis 40A of the liquid crystal compound 40 rotates to the right (clockwise) in the direction indicated by the arrow of the arrangement axis D.

On the other hand, in the liquid crystal compound 40 forming the optically-anisotropic layer 37, the directions of the optical axes 40A are the same in the Y direction perpendicular to the arrangement axis D direction, that is, the Y direction perpendicular to the one in-plane direction in which the optical axis 40A continuously rotates.

In other words, in the liquid crystal compound 40 forming the optically-anisotropic layer 37, angles between the optical axes 40A of the liquid crystal compound 40 and the arrangement axis D direction are the same in the Y direction.

In the liquid crystal compounds 40 arranged in the Y direction in the optically-anisotropic layer 37, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Delta n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference $\Delta n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Delta n$ in refractive index is the same as the difference in refractive index of the liquid crystal compound 40.

In the optically-anisotropic layer 37, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length $\Lambda$ of the single period in the liquid crystal alignment pattern.

That is, a distance between centers of two liquid crystal compounds 40 in the arrangement axis D direction is the length $\Lambda$ of the single period, the two liquid crystal compounds having the same angle in the arrangement axis D direction. Specifically, as shown in FIG. 12, a distance between centers in the arrangement axis D direction of two liquid crystal compounds 40 in which the arrangement axis D direction and the direction of the optical axis 40A match each other is the length $\Lambda$ of the single period. In the following description, the length $\Lambda$ of the single period will also be referred to as "single period $\Lambda$".

In the liquid crystal alignment pattern of the optically-anisotropic layer 37, the single period $\Lambda$ is repeated in the arrangement axis D direction, that is, in the one in-plane direction in which the direction of the optical axis 40A changes while continuously rotating.

In a case where circularly polarized light is incident into the above-described optically-anisotropic layer 37, the light is refracted such that the direction of the circularly polarized light is converted.

Figure 14:
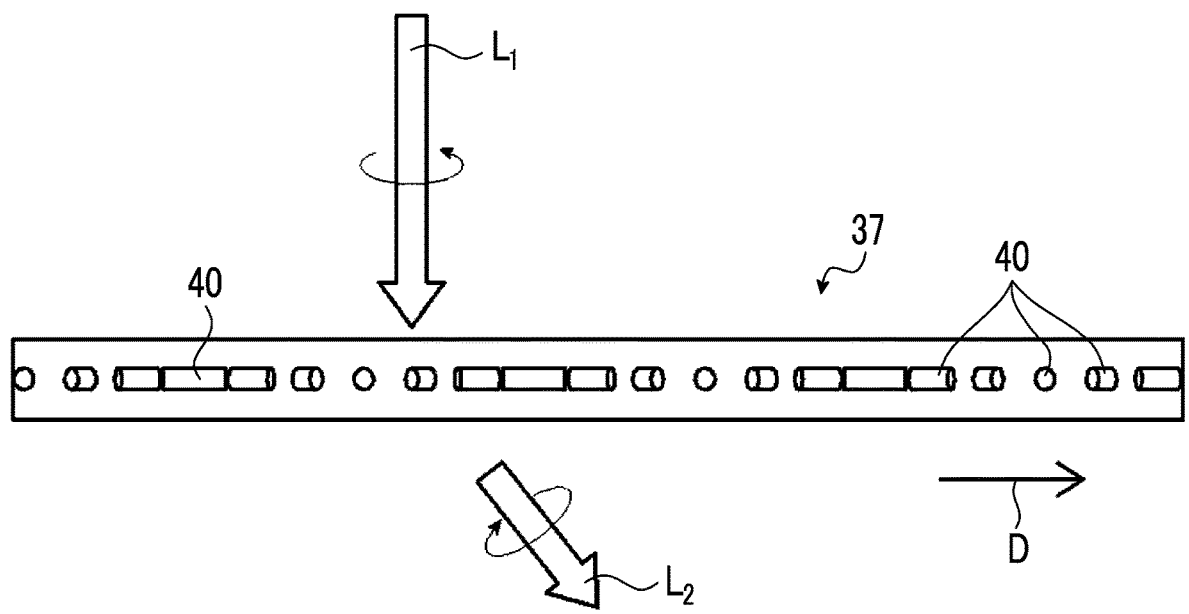
FIG. 14 is a conceptual diagram showing an action of the optically-anisotropic layer.
Figure 15:
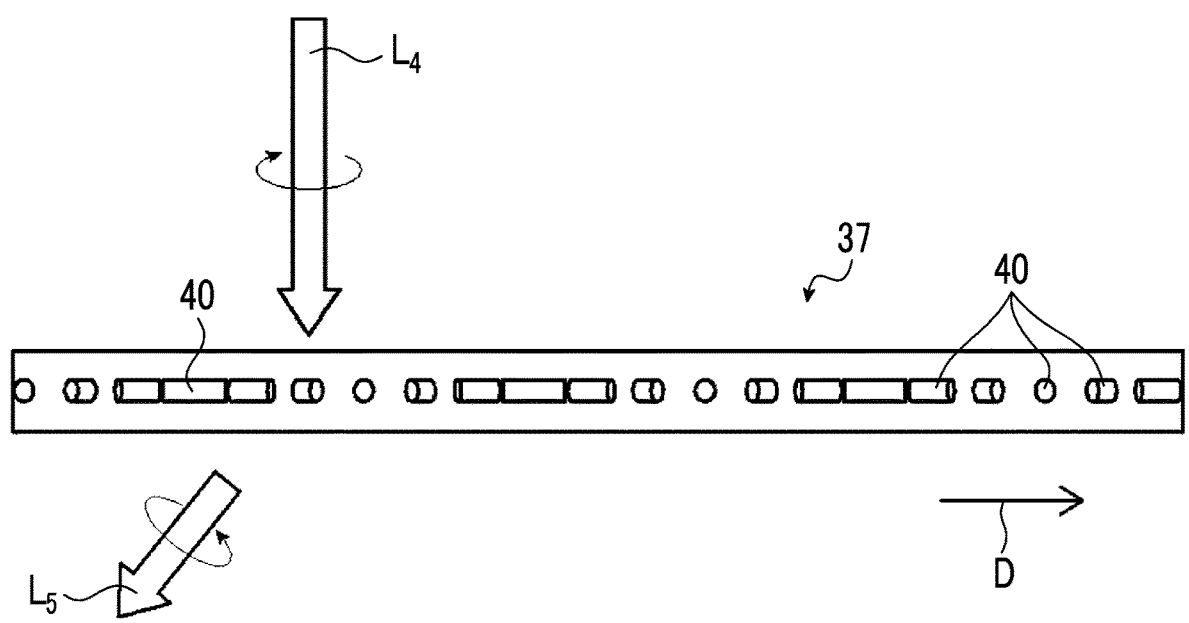
FIG. 15 is a conceptual diagram showing the action of the optically-anisotropic layer.

This action is conceptually shown in FIGS. 14 and 15. In the optically-anisotropic layer 37, the value of the product of the difference in refractive index of the liquid crystal compound and the thickness of the optically-anisotropic layer is $\lambda/2$.

As shown in FIG. 14, in a case where the value of the product of the difference in refractive index of the liquid crystal compound and the thickness of the optically-anisotropic layer in the optically-anisotropic layer 37 is $\lambda/2$ and incidence light $L_1$ as left circularly polarized light is incident into the optically-anisotropic layer 37, the incidence light $L_1$ transmits through the optically-anisotropic layer 37 to be imparted with a retardation of 180°, and the transmitted light $L_2$ is converted into right circularly polarized light.

In addition, the liquid crystal alignment pattern formed in the optically-anisotropic layer 37 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction. In the example shown in FIG. 14, the transmitted light $L_2$ is diffracted to travel in the lower right direction.

On the other hand, as shown in FIG. 15, in a case where the value of the product of the difference in refractive index of the liquid crystal compound and the thickness of the optically-anisotropic layer in the optically-anisotropic layer 37 is $\lambda/2$ and incidence light $L_4$ as right circularly polarized light is incident into the optically-anisotropic layer 37, the incidence light $L_4$ transmits through the optically-anisotropic layer 37 to be imparted with a retardation of 180° and is converted into transmitted light $L_5$ of left circularly polarized light.

In addition, the liquid crystal alignment pattern formed in the optically-anisotropic layer 37 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrow direction of the arrangement axis D with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction. In the example shown in FIG. 15, the transmitted light $L_5$ is diffracted to travel in the lower left direction.

Here, refraction angles of the transmitted light components $L_2$ and $L_5$ can be adjusted depending on the length of the single period $\Lambda$ of the liquid crystal alignment pattern formed in the optically-anisotropic layer 37. Specifically, even in the optically-anisotropic layer 37, as the single period $\Lambda$ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 14 and 15, the rotation direction of the optical axis 40A toward the arrangement axis D direction is clockwise. By setting this rotation direction to be counterclockwise, the refraction direction of transmitted light can be reversed. Specifically, in FIGS. 14 and 15, in a case where the rotation direction of the optical axis 40A toward the arrangement axis D direction is counterclockwise, left circularly polarized light incident into the optically-anisotropic layer from the upper side in the drawing transmits through the optically-anisotropic layer such that the transmitted light is converted into right circularly polarized light and is diffracted to travel in the lower left direction in the drawing. In addition, right circularly polarized light incident into the optically-anisotropic layer from the upper side in the drawing transmits through the optically-anisotropic layer such that the transmitted light is converted into left circularly polarized light and is diffracted to travel in the lower right direction in the drawing.

In the optically-anisotropic layer, it is preferable that the in-plane retardation value of the plurality of regions R is a half wavelength. It is preferable that an in-plane retardation $Re(550)=\Delta n_{550} \times d$ of the plurality of regions R of the optically-anisotropic layer with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically-anisotropic layer.

$$200 \text{ nm} \leq \Delta n_{550} \times d \leq 350 \text{ nm} \tag{1}$$

That is, in a case where the in-plane retardation $Re(550)=\Delta n_{550} \times d$ of the plurality of regions R of the optically-anisotropic layer satisfies Expression (1), a sufficient amount of a circularly polarized light component in light incident into the optically-anisotropic layer can be converted into circularly polarized light that travels in a direction tilted in a forward direction or reverse direction with respect to the arrangement axis D direction. It is more preferable that the in-plane retardation $Re(550)=\Delta n_{550} \times d$ satisfies $225 \text{ nm} \leq \Delta n_{550} \times d \leq 340 \text{ nm}$, and it is still more preferable that the in-plane retardation $Re(550)=\Delta n_{550} \times d$ satisfies $250 \text{ nm} < \Delta n_{550} \times d < 330 \text{ nm}$.

Expression (1) is a range with respect to incidence light having a wavelength of 550 nm. However, an in-plane retardation $Re(\lambda)=\Delta n_\lambda \times d$ of the plurality of regions R of the optically-anisotropic layer with respect to incidence light having a wavelength of $\lambda$ nm is preferably in a range defined by the following Expression (1-2) and can be appropriately set.

$$0.7 \times (\lambda/2) \text{ nm} \leq \Delta n_\lambda \times d \leq 1.3 \times (\lambda/2) \text{ nm} \tag{1-2}$$

In addition, the value of the in-plane retardation of the plurality of regions R of the optically-anisotropic layer in a range outside the range of Expression (1) can also be used. Specifically, by satisfying $\Delta n_{550} \times d < 200$ nm or $350 \text{ nm} < \Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450)=\Delta n_{450} \times d$ of each of the plurality of regions R of the optically-anisotropic layer with respect to incidence light having a wavelength of 450 nm and an in-plane retardation $Re(550)=\Delta n_{550} \times d$ of each of the plurality of regions R of the optically-anisotropic layer with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \tag{2}$$

Expression (2) represents that the liquid crystal compound 40 in the optically-anisotropic layer has reverse dispersion properties. That is, by satisfying Expression (2), the optically-anisotropic layer can correspond to incidence light having a wide wavelength range.

Although the optically-anisotropic layer functions as a so-called $\lambda/2$ plate, the present invention also includes an aspect where a laminate including the support and the alignment film that are integrated functions as a so-called $\lambda/2$ plate.

Here, in the liquid crystal alignment pattern of the optically-anisotropic layer in the transmissive liquid crystal diffraction element shown in FIG. 1 and the like, the arrangement axis D is parallel to the one in-plane direction. However, the present invention is not limited thereto, and various configurations can be used as long as the optical axis 40A of the liquid crystal compound 40 in the optically-anisotropic layer continuously rotates at least in the one in-plane direction.

Figure 16:
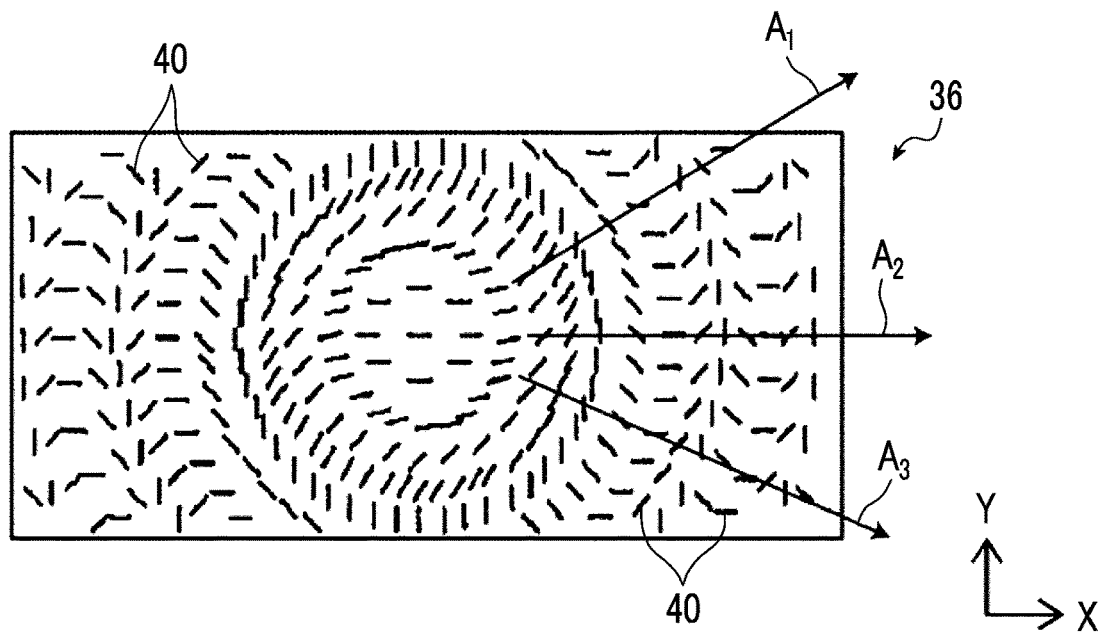
FIG. 16 is a plan view showing another example of the optically-anisotropic layer in the transmissive liquid crystal diffraction element according to the present invention.

For example, an optically-anisotropic layer conceptually shown in a plan view of FIG. 16 can be used, in which a liquid crystal alignment pattern is a concentric circular pattern having a concentric circular shape where the one in-plane direction (arrows $A_1$ to $A_3$) in which the direction of the optical axis of the liquid crystal compound 40 changes while continuously rotating moves from an inner side toward an outer side. The concentric circular pattern is a pattern in which a line that connects liquid crystal compounds of which optical axes face the same direction has a circular shape and circular line segments have a concentric circular shape. In other words, the liquid crystal alignment pattern of the optically-anisotropic layer 36 (37) shown in FIG. 16 is a liquid crystal alignment pattern where the one in-plane direction in which the direction of the optical axis of the liquid crystal compound 40 changes while continuously rotating is provided in a radial shape from the center of the optically-anisotropic layer 36.

FIG. 16 shows only the liquid crystal compound 40 of the surface of the alignment film. However, the optically-anisotropic layer has the structure in which the liquid crystal compound 40 on the surface of the alignment film is laminated in the thickness direction as described above.

In the optically-anisotropic layer 36 shown in FIG. 16, the optical axis (not shown) of the liquid crystal compound 40 is a longitudinal direction of the liquid crystal compound 40.

In the optically-anisotropic layer 36, the direction of the optical axis of the liquid crystal compound 40 changes while continuously rotating in a direction in which a large number of optical axes move to the outer side from the center of the optically-anisotropic layer 36, for example, a direction indicated by an arrow $A_1$, a direction indicated by an arrow $A_2$, a direction indicated by an arrow $A_3$, or . . . . The arrow $A_1$, the arrow $A_2$, and the arrow $A_3$ are the above-described arrangement axes. Accordingly, for example, in a case where a cross-section taken along the arrow $A_1$ is observed with an SEM, the bright portions and dark portions shown in FIG. 2 are observed. The same can be applied to SEM images of a cross-section taken along the arrow $A_2$ and a cross-section taken along the arrow $A_3$.

In addition, as a preferable aspect, for example, the direction of the optical axis of the liquid crystal compound changes while rotating in a radial direction from the center of the optically-anisotropic layer as shown in FIG. 16. In the aspect shown in FIG. 16, counterclockwise alignment is shown. The rotation directions of the optical axes indicated by the respective arrows $A_1$, $A_2$, and $A_3$ in FIG. 16 are counterclockwise toward the outer side from the center.

This way, in the optically-anisotropic layer having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 40 and the turning direction of circularly polarized light to be incident.

That is, by setting the liquid crystal alignment pattern of the optically-anisotropic layer in a concentric circular shape, the transmissive liquid crystal diffraction element according to the embodiment of the present invention exhibits, for example, a function as a concave lens or a convex lens.

Here, in a case where the liquid crystal alignment pattern of the optically-anisotropic layer is concentric circular such that the transmissive liquid crystal diffraction element functions as a convex lens, it is preferable that the length of the single period Λ over which the optical axis rotates by 180° in the liquid crystal alignment pattern gradually decreases from the center of the optically-anisotropic layer toward the outer direction in the one in-plane direction in which the optical axis continuously rotates.

As described above, the diffraction angle of light incident into the optically-anisotropic layer increases as the length of the single period Λ in the liquid crystal alignment pattern decreases. Accordingly, the length of the single period Λ in the liquid crystal alignment pattern gradually decreases from the center of the optically-anisotropic layer toward the outer direction in the one in-plane direction in which the optical axis continuously rotates. As a result, light can be further gathered, and the performance as a convex lens can be improved.

In the present invention, in a case where the transmissive liquid crystal diffraction element functions as a concave lens, it is preferable that the continuous rotation direction of the optical axis in the liquid crystal alignment pattern is in a direction opposite to that of the case of the above-described convex lens from the center of the optically-anisotropic layer.

In addition, by gradually decreasing the length of the single period Λ over which the optic axis rotates by 180° from the center of the optically-anisotropic layer toward the outer direction in the one in-plane direction in which the optical axis continuously rotates, the optically-anisotropic layer can further diffuse light, and the performance as a concave lens can be improved.

In the present invention, in a case where the liquid crystal diffraction element functions as a concave lens, it is preferable that a direction of circularly polarized light (sense of a helical structure) that transmit through the optically-anisotropic layer is reversed to be opposite to that in the case of a convex lens, that is, the helical turning direction of the optically-anisotropic layer is reversed.

In this case, by gradually decreasing the length of the single period Λ over which the optical axis rotates by 180° from the center of the optically-anisotropic layer toward the outer direction in the one in-plane direction in which the optical axis continuously rotates, light reflected from the optically-anisotropic layer can be further dispersed, and the performance as a concave lens can be improved.

In a state where the helical turning direction of the optically-anisotropic layer is reversed, the continuous rotation direction of the optical axis in the liquid crystal alignment pattern is reversed from the center of the optically-anisotropic layer. As a result, the transmissive liquid crystal diffraction element can be made to function as a convex lens.

In the present invention, in a case where the transmissive liquid crystal diffraction element is made to function as a convex lens or a concave lens, it is preferable that the liquid crystal diffraction element satisfies the following expression.

$$\Phi(r)=(\pi/\lambda)[(r^2+f^2)^{1/2}-f]$$

Here, r represents a distance from the center of a concentric circle and is represented by Expression "$r=(x^2+y^2)^{1/2}$". x and y represent in-plane positions, and $(x,y)=(0,0)$ represents the center of the concentric circle. $\Phi(r)$ represents an angle of the optical axis at the distance r from the center, λ represents the selective reflection center wavelength of the optically-anisotropic layer, and f represents a desired focal length.

In the present invention, depending on the uses of the liquid crystal diffraction element, conversely, the length of the single period Λ in the concentric circular liquid crystal alignment pattern may gradually increase from the center of the optically-anisotropic layer toward the outer direction in the one in-plane direction in which the optical axis continuously rotates.

Further, depending on the uses of the liquid crystal diffraction element such as a case where it is desired to provide a light amount distribution in transmitted light, a configuration in which regions having partially different lengths of the single periods Λ in the one in-plane direction in which the optical axis continuously rotates are provided can also be used instead of the configuration in which the length of the single period Λ gradually changes in the one in-plane direction in which the optical axis continuously rotates.

In the transmissive liquid crystal diffraction element according to the embodiment of the present invention, even in a case where the optically-anisotropic layer has the concentric circular liquid crystal alignment pattern, the tilt angles of the dark portions of the plurality of optically-anisotropic layers change in order in the thickness direction.

Even in a case where the optically-anisotropic layer of the transmissive liquid crystal diffraction element has the concentric circular liquid crystal alignment pattern, in at least one of the optically-anisotropic layers, the tilt angle of the dark portion gradually changes in the one in-plane direction in which the optical axis continuously rotates. The configuration where the tilt angle of the dark portion gradually changes in the one in-plane direction in which the optical axis continuously rotates can be formed by gradually changing the single period Λ of the liquid crystal alignment pattern in the one in-plane direction and/or gradually changing the twisted angle of the thickness direction in the one in-plane direction. By adopting the configuration where the tilt angle of the dark portion gradually changes in the one in-plane direction in which the optical axis continuously rotates, in the optically-anisotropic layer having the concentric circular liquid crystal alignment pattern, the diffraction efficiency in a region near the center where the diffraction angle is small and the diffraction efficiency in a region near the outer side where the diffraction angle is large can be made uniform.

As a method of forming the concentric circular alignment pattern, a well-known method described in Optica Vol. 2, No. 11 Nov. 2015 p. 958-p. 964, Adv. Mater. 2019, 1903665 p. 1-p. 21, Opt. Data Process. Storage 2017 (3) 79-88 can be used.

For example, an interference exposure method of splitting a laser beam from a laser light source into two beams and causing the two beams to interfere with each other and a direct exposure method of exposing a minute region to polarized light while scanning the minute region.

The interference exposure method is a method of splitting a laser beam from a light source having high coherence, for example, a laser light source into two beams with a beam splitter and causing the two beams to interfere (combine) with each other to obtain a desired alignment pattern.

In order to obtain the concentric circular alignment pattern, it is preferable that at least one of the two beams split by the beam splitter or the like is a spherical wave. In order to obtain a spherical wave, a lens 92 is disposed in the exposure device.

An object to be irradiated, for example, the alignment film may be disposed outside or inside the focal point of the lens 92. By disposing the alignment film outside the focal point of the lens 92, a space for disposing an optical element such as a beam splitter or a λ/4 plate between the lens and the alignment film can be secured. In addition, by disposing the alignment film inside the focal point of the lens 92, the size of the exposure device can be reduced.

In the interference exposure method, it is also preferable that the lens 92 is used in combination with another lens. By adopting a relay optical system where a plurality of lenses depending on the focal lengths, a space for disposing an optical element can be further secured. In addition, by disposing the plurality of lenses in series, the degree of freedom in the exposure pattern can be increased.

In addition to the lens 92, another lens can also be used for reference light side. In this case, the alignment film is exposed to the pattern obtained by the interference of the two spherical waves. Therefore, the degree of freedom for the exposure pattern can be increased.

The characteristics of the lens 92 may be appropriately adjusted depending on the desired exposure pattern, and the lens 92 may be a spherical lens or an aspherical lens.

In the interference exposure method, in a case where the two beams are caused to interfere with each other (are combined), the two beams may be irradiated from the front and back side of a sample to interfere with each other on the surface of the object to be irradiated.

In order to realize any exposure pattern, exposure may be performed multiple times using different exposure patterns.

Each of different regions in a plane may be exposed, or exposure may be repeatedly performed using a part of the pattern to overwrite the pattern.

Figure 17:
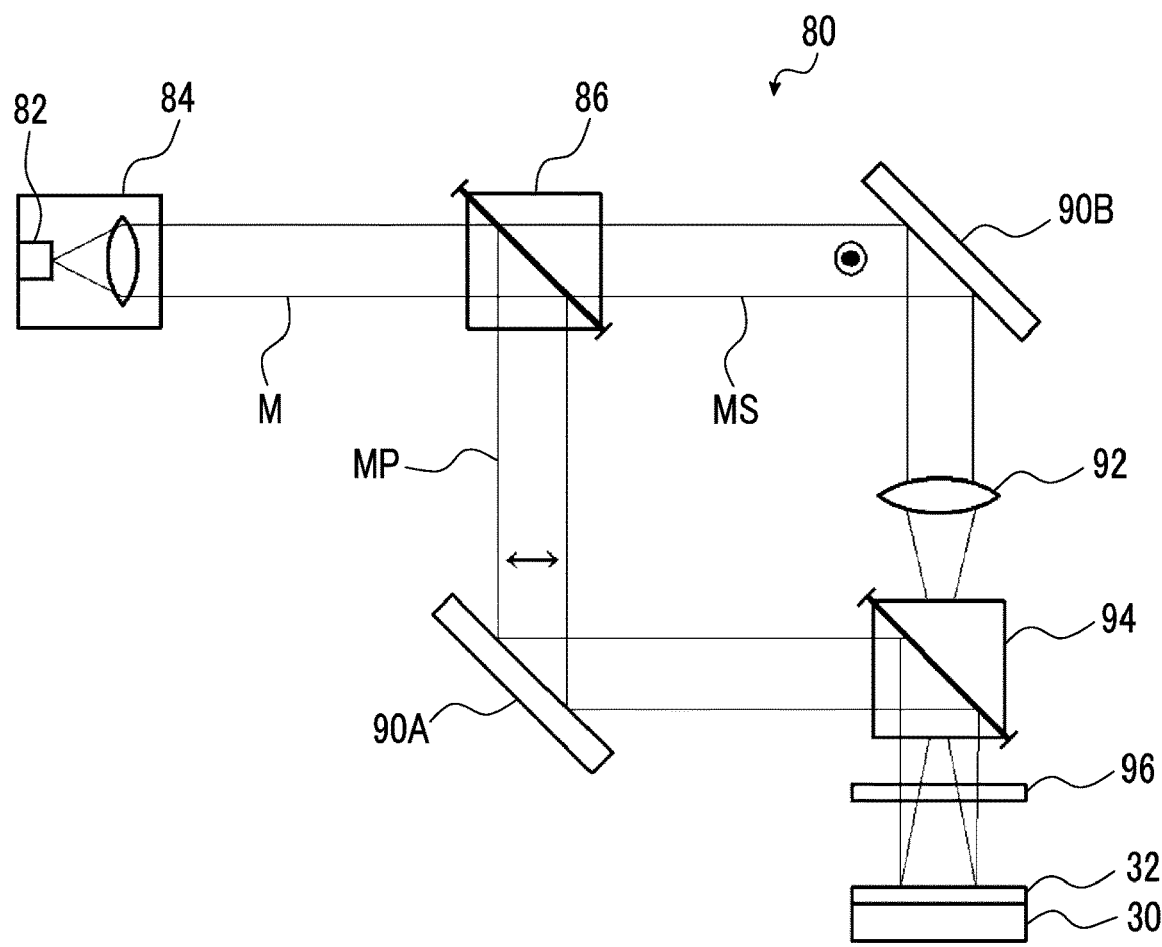
FIG. 17 is a diagram conceptually showing one example of an exposure device that exposes an alignment film forming the optically-anisotropic layer shown in FIG. 16.

FIG. 17 conceptually shows an example of an exposure device that forms the concentric circular alignment pattern in the alignment film.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are combined by the polarization beam splitter 94, are converted into right circularly polarized light and left circularly polarized light by the λ/4 plate 96 depending on the polarization direction, and are incident into the alignment film 32 on the support 30.

Here, due to interference between the right circularly polarized light and the left circularly polarized light, the polarization state of light with which the alignment film 32 is irradiated periodically changes according to interference fringes. The intersecting angle between the right circularly polarized light and the left circularly polarized light changes from the inner side to the outer side of the concentric circle. Therefore, an exposure pattern in which the pitch changes from the inside to the outside can be obtained. As a result, in the alignment film 32, a concentric circular alignment pattern in which the alignment state periodically changes can be obtained.

In the exposure device 80, the length Λ of the single period in the liquid crystal alignment pattern in which the optical axis of the liquid crystal compound 40 continuously rotates by 180° can be controlled by changing the refractive power of the lens 92 (the F number of the lens 92), the focal length of the lens 92, the distance between the lens 92 and the alignment film 32, and the like.

In addition, by adjusting the refractive power of the lens 92 (the F number of the lens 92), the length Λ of the single period in the liquid crystal alignment pattern in the one in-plane direction in which the optical axis continuously rotates can be changed. Specifically, In addition, the length Λ of the single period in the liquid crystal alignment pattern in the one in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inner side toward the outer side, and the F number increases. Conversely, in a case where the refractive power of the lens 92 becomes stronger, the length Λ of the single period in the liquid crystal alignment pattern rapidly decreases from the inner side toward the outer side, and the F number decreases.

Further, depending on the applications of the transmissive liquid crystal diffraction element such as a case where it is desired to provide a light amount distribution in transmitted light, a configuration in which regions having partially different lengths of the single periods Λ in the arrangement axis D direction are provided can also be used instead of the configuration in which the length of the single period Λ gradually changes in the arrangement axis D direction. For example, as a method of partially changing the single period Λ, for example, a method of scanning and exposing the photo-alignment film to be patterned while freely changing a polarization direction of laser light to be collected can be used.

As described above, the optically-anisotropic layer is formed by forming the alignment film having the above-described alignment pattern on the support and applying the liquid crystal composition to the alignment film, and curing the applied liquid crystal composition. The structure of the optically-anisotropic layer where the optical axis of the liquid crystal compound is twisted in the thickness direction of the optically-anisotropic layer and rotates can be formed by adding the above-described chiral agent to the liquid crystal composition. In addition, the configuration where the twisted angle of the thickness direction varies depending on in-plane regions can be formed by adding a photoreactive chiral agent to the liquid crystal composition, applying the liquid crystal composition to the alignment film, and irradiating the regions with light at different irradiation doses such that the helical twisting power (HTP) of the photoreactive chiral agent varies depending on the regions.

Specifically, the configuration of the optically-anisotropic layer where the twisted angle of the thickness direction varies depending on in-plane regions can be formed by using the chiral agent in which back isomerization, dimerization, isomerization, dimerization or the like occurs due to light irradiation such that the helical twisting power (HTP) changes and irradiating the liquid crystal composition for forming the optically-anisotropic layer with light having a wavelength at which the HTP of the chiral agent changes before or during the curing of the liquid crystal composition while changing the irradiation dose depending on the regions.

For example, by using a chiral agent in which the HTP decreases during light irradiation, the HTP of the chiral agent decreases during light irradiation. Here, by changing the irradiation dose of light for each of the regions, for example, in a region that is irradiated with the light at a high irradiation dose, the decrease in HTP is large, the induction of helix is small, and thus the twisted angle of the twisted structure decreases. On the other hand, in a region that is irradiated with the light at a low irradiation dose, a decrease in HTP is small, and thus the twisted angle of the twisted structure is large.

The method of changing the irradiation dose of light for each of the regions is not particularly limited, and a method of irradiating light through a gradation mask, a method of changing the irradiation time for each of the regions, or a method of changing the irradiation intensity for each of the regions can be used.

The gradation mask refers to a mask in which a transmittance with respect to light for irradiation changes in a plane.

—Photoreactive Chiral Agent—

The photoreactive chiral agent is formed of, for example, a compound represented by the following Formula (I) and has properties capable of controlling an aligned structure of the liquid crystal compound and changing a helical pitch of the liquid crystal compound, that is, a helical twisting power (HTP) of a helical structure during light irradiation. That is, the photoreactive chiral agent is a compound that causes a helical twisting power of a helical structure derived from a liquid crystal compound, preferably, a nematic liquid crystal compound to change during light irradiation (ultraviolet light to visible light to infrared light), and includes a portion including a chiral portion and a portion in which a structural change occurs during light irradiation as necessary portions (molecular structural units). However, the photoreactive chiral agent represented by the following Formula (I) can significantly change the HTP of liquid crystal molecules.

The above-described HTP represents the helical twisting power of a helical structure of liquid crystal, that is, HTP=1/(Pitch×Chiral Agent Concentration [Mass Fraction]). For example, the HTP can be obtained by measuring a helical pitch (single period of the helical structure; m) of a liquid crystal molecule at a given temperature and converting the measured value into a value [$km^{-1}$] in terms of the concentration of the chiral agent. In a case where a selective reflection color is formed by the photoreactive chiral agent depending on the illuminance of light, a rate of change in HTP (HTP before irradiation/HTP after irradiation) is preferably 1.5 or higher and more preferably 2.5 or higher in a case where the HTP decreases after irradiation, and is preferably 0.7 or lower and more preferably 0.4 or lower in a case where the HTP increases after irradiation.

Next, the compound represented by Formula (I) will be described.

Formula (I)

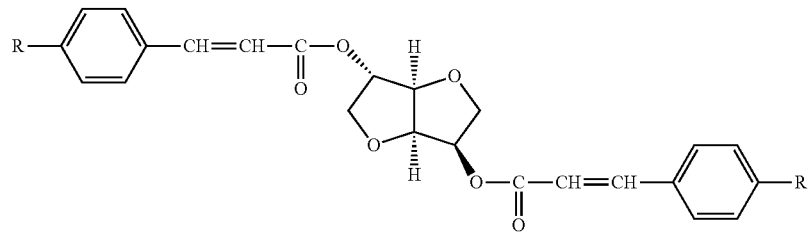

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, and a dodecyloxy group. In particular, an alkoxy group having 1 to 12 carbon atoms is preferable, and an alkoxy group having 1 to 8 carbon atoms is more preferable.

Examples of the acryloyloxyalkyloxy group having 3 to 15 carbon atoms in total include an acryloyloxyethyloxy group, an acryloyloxybutyloxy group, and an acryloyloxydecyloxy group. In particular, an acryloyloxyalkyloxy group having 5 to 13 carbon atoms is preferable, and an acryloyloxyalkyloxy group having 5 to 11 carbon atoms is more preferable.

Examples of the methacryloyloxyalkyloxy group having 4 to 15 carbon atoms in total include a methacryloyloxyethyloxy group, a methacryloyloxybutyloxy group, and a methacryloyloxydecyloxy group. In particular, a methacryloyloxyalkyloxy group having 6 to 14 carbon atoms is preferable, and a methacryloyloxyalkyloxy group having 6 to 12 carbon atoms is more preferable.

The molecular weight of the photoreactive chiral agent represented by Formula (I) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (1) to (15)) of the compound represented by Formula (I) will be shown, but the present invention is not limited thereto.

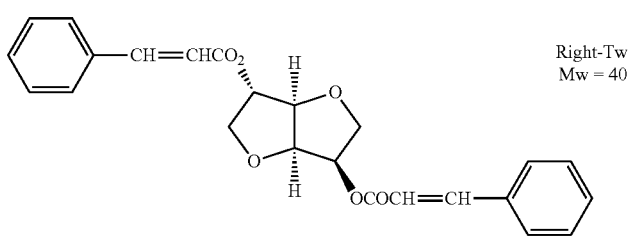

(1)
Right-Twisted
Mw = 406.43

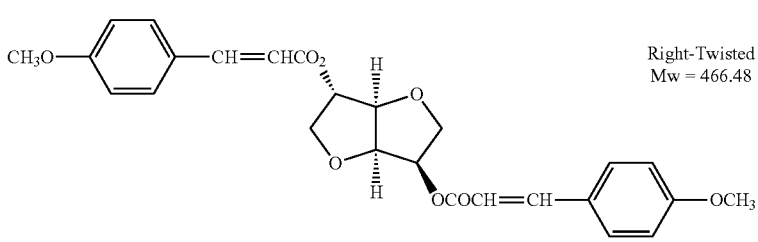

(2)
Right-Twisted
Mw = 466.48

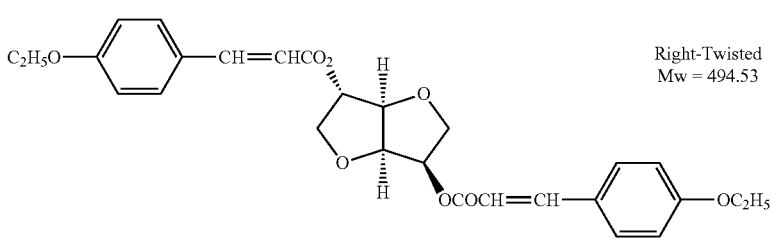

(3)
Right-Twisted
Mw = 494.53

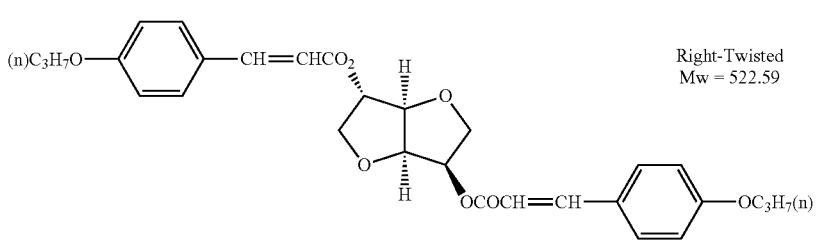

(4)
Right-Twisted
Mw = 522.59

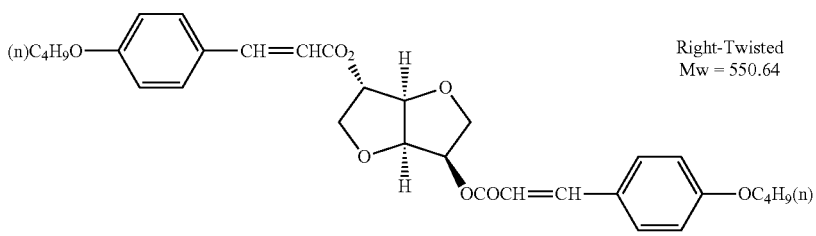

(5)
Right-Twisted
Mw = 550.64

-continued
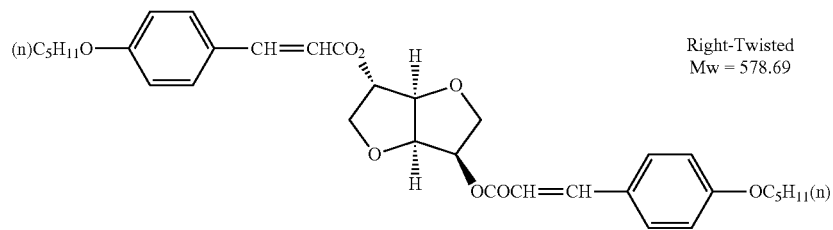
(6) Right-Twisted Mw = 578.69
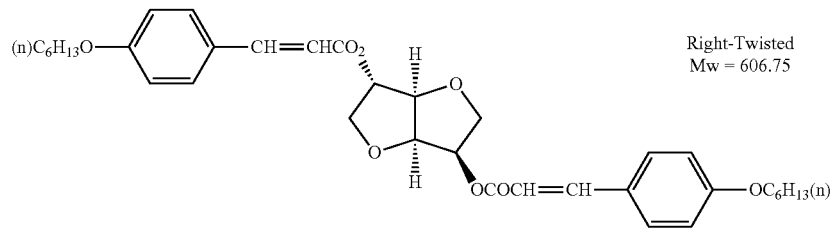
(7) Right-Twisted Mw = 606.75
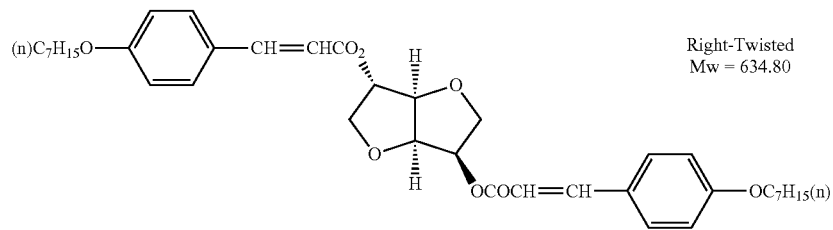
(8) Right-Twisted Mw = 634.80
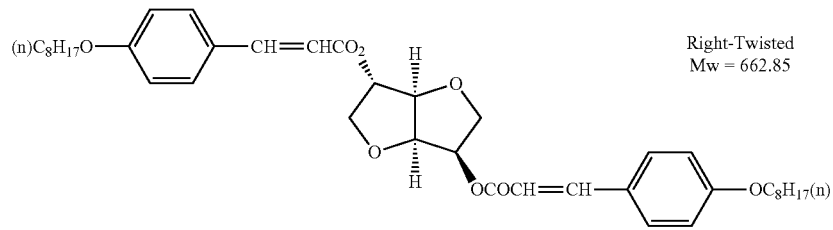
(9) Right-Twisted Mw = 662.85
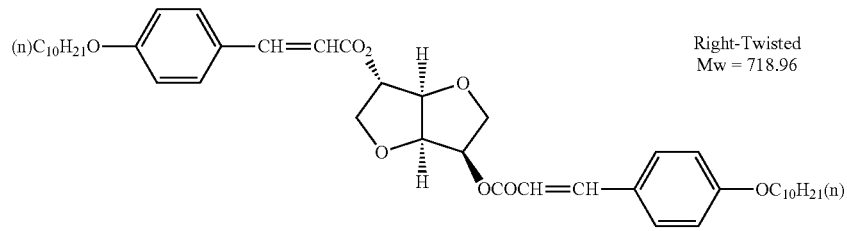
(10) Right-Twisted Mw = 718.96
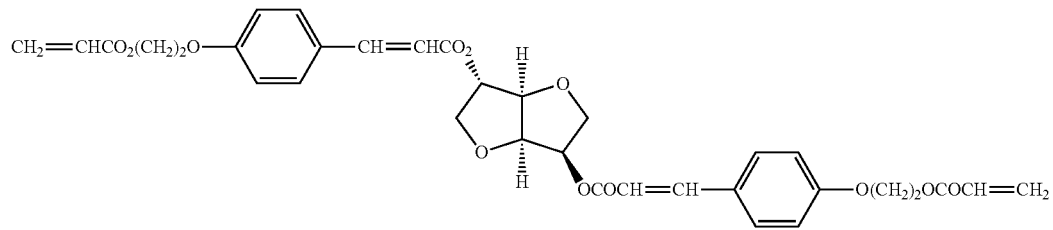
(11)

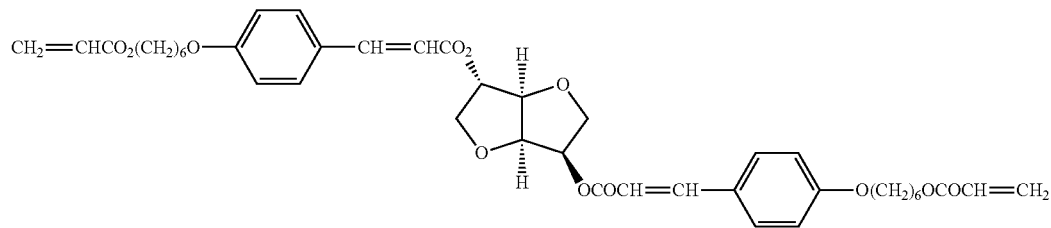
(12)

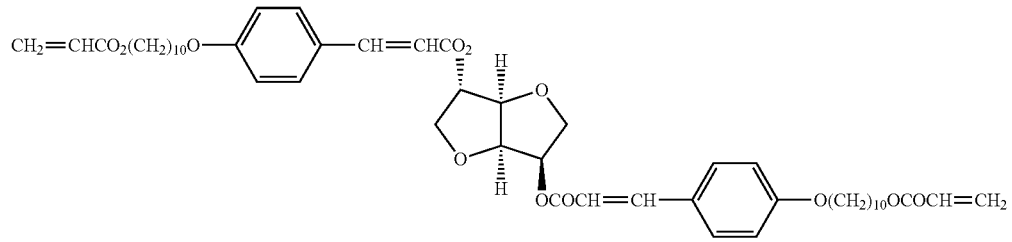
(13)

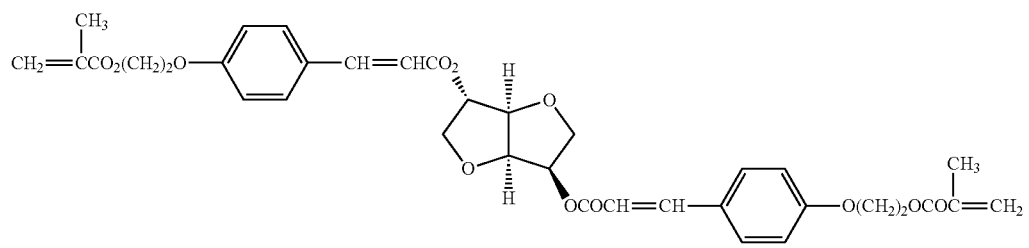
(14)

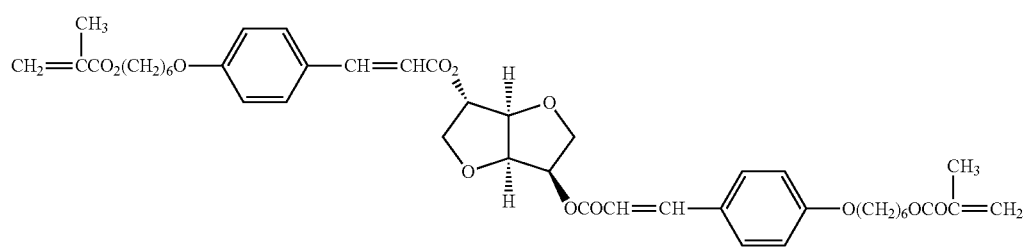
(15)

In the present invention, as the photoreactive chiral agent, for example, a photoreactive optically active compound represented by the following Formula (II) is also used.

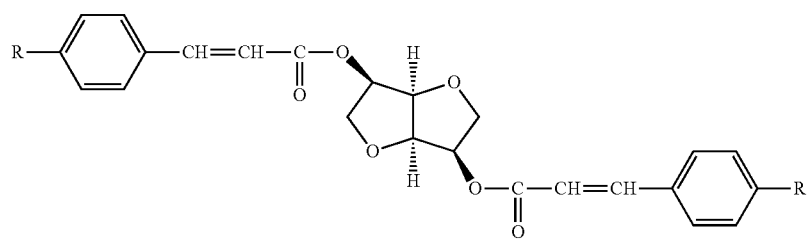
Formula (II)

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, an octyloxy group, and a dodecyloxy group. In particular, an alkoxy group having 1 to 10 carbon atoms is preferable, and an alkoxy group having 1 to 8 carbon atoms is more preferable.

Examples of the acryloyloxyalkyloxy group having 3 to 15 carbon atoms in total include an acryloyloxy group, an acryloyloxyethyloxy group, an acryloyloxypropyloxy group, an acryloyloxyhexyloxy group, an acryloyloxybutyloxy group, and an acryloyloxydecyloxy group. In particular, an acryloyloxyalkyloxy group having 3 to 13 carbon atoms is preferable, and an acryloyloxyalkyloxy group having 3 to 11 carbon atoms is more preferable.

Examples of the methacryloyloxyalkyloxy group having 4 to 15 carbon atoms in total include a methacryloyloxy group, a methacryloyloxyethyloxy group, and a methacryloyloxyhexyloxy group. In particular, a methacryloyloxyalkyloxy group having 4 to 14 carbon atoms is preferable, and a methacryloyloxyalkyloxy group having 4 to 12 carbon atoms is more preferable.

The molecular weight of the photoreactive optically active compound represented by Formula (II) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (21) to (32)) of the photoreactive optically active compound represented by Formula (II) will be shown, but the present invention is not limited thereto.

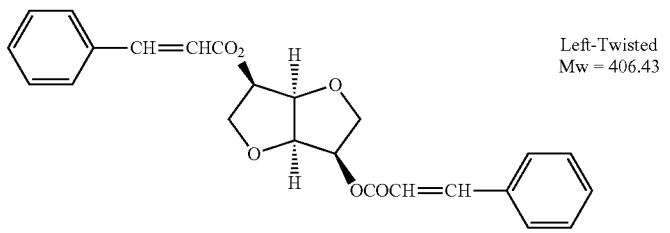

(21) Left-Twisted Mw = 406.43

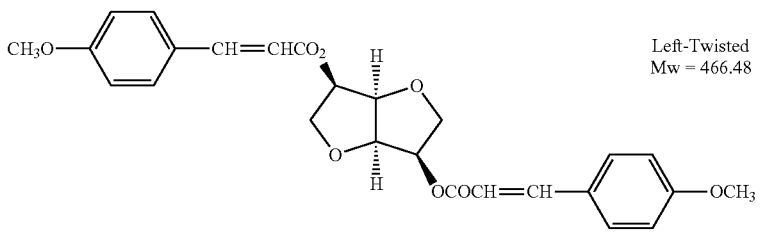

(22) Left-Twisted Mw = 466.48

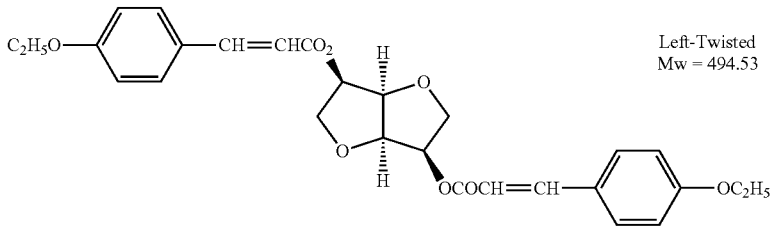

(23) Left-Twisted Mw = 494.53

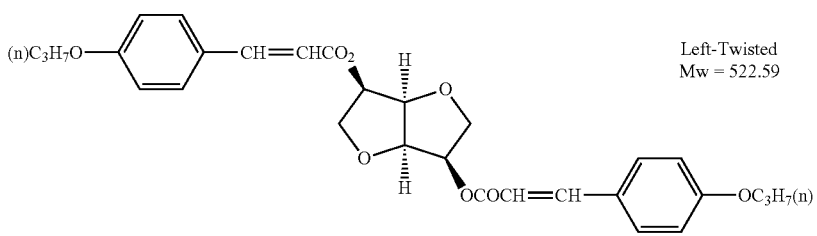

(24) Left-Twisted Mw = 522.59

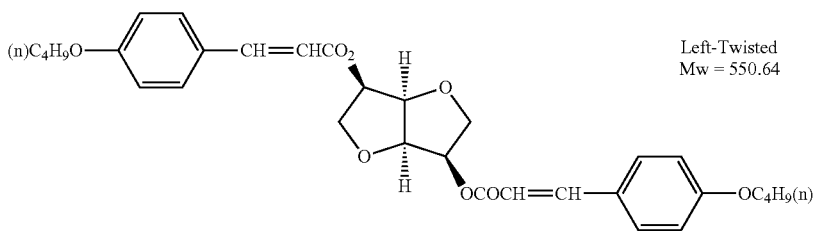

(25) Left-Twisted Mw = 550.64

(26)
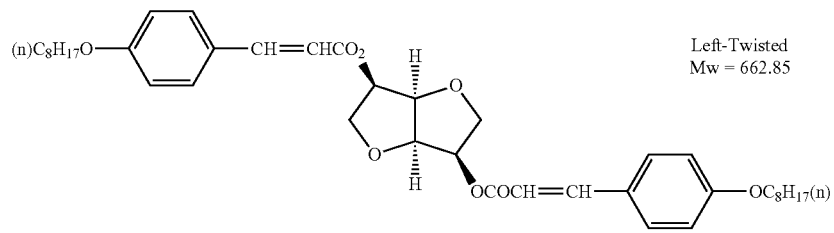
Left-Twisted
Mw = 662.85
(27)
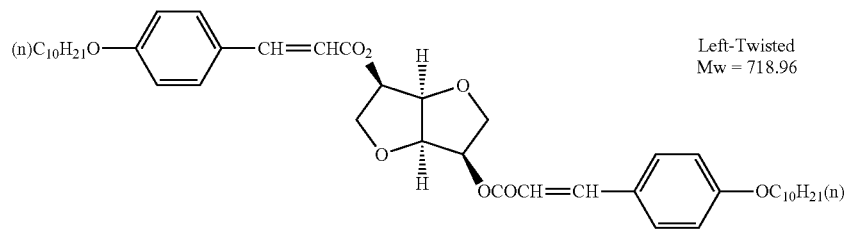
Left-Twisted
Mw = 718.96
(28)
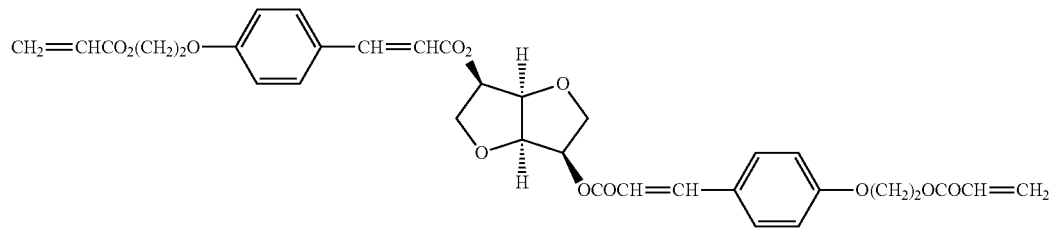
(29)
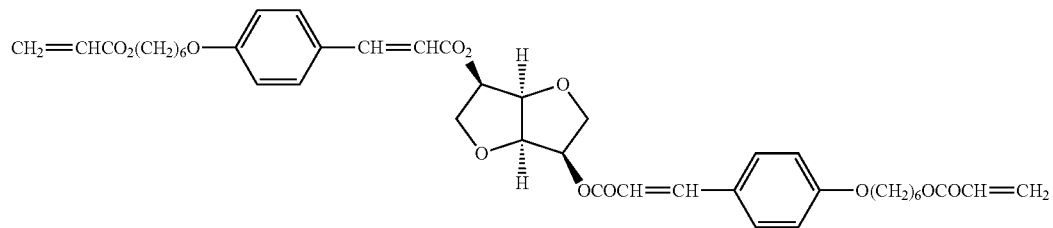
(30)
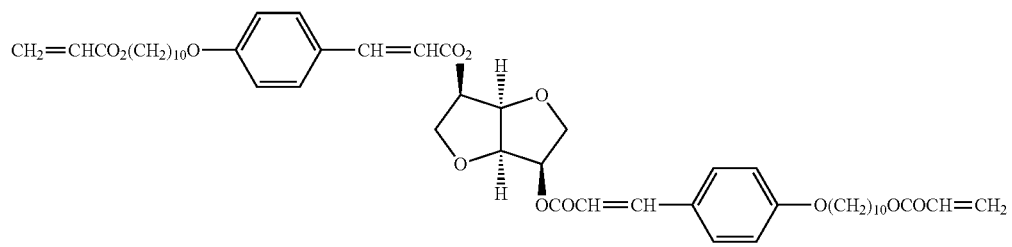

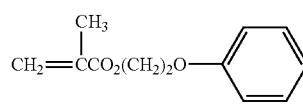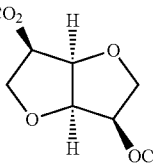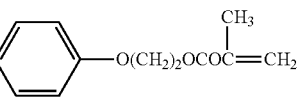

(31)

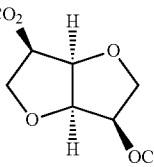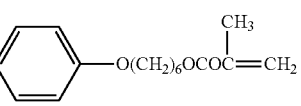

(32)

In addition, the photoreactive chiral agent can also be used in combination with a chiral agent having no photoreactivity such as a chiral compound having a large temperature dependence of the helical twisting power. Examples of the well-known chiral agent having no photoreactivity include chiral agents described in JP2000-044451A, JP1998-509726A (JP-H10-509726A), WO98/000428A, JP2000-506873A, JP1997-506088A (JP-H09-506088A), Liquid Crystals (1996, 21, 327), and Liquid Crystals (1998, 24, 219).

The transmissive liquid crystal diffraction element according to the embodiment of the present invention can be used for various uses where transmission of light in a direction different from an incidence direction is allowed, for example, an optical path changing member, a light collecting element, a light diffusing element to a predetermined direction, a diffraction element, or the like in an optical device.

The transmissive liquid crystal diffraction element according to the embodiment of the present invention may allow transmission of visible light and refract the transmitted light, or may refract infrared light and/or ultraviolet light and allow the refracted light.

The transmissive liquid crystal diffraction element according to the embodiment of the present invention can be used as an optical element combined with a circularly polarizing plate.

A part of circularly polarized light incident into the transmissive liquid crystal diffraction element may transmit through the transmissive liquid crystal diffraction element (zero-order light) without being diffracted. The circularly polarized light that is not diffracted by the transmissive liquid crystal diffraction element may decrease the performance depending on applications. On the other hand, by using the transmissive liquid crystal diffraction element and the circularly polarizing plate in combination, the light (zero-order light) transmitted through the transmissive liquid crystal diffraction element without being diffracted can be reduced.

For example, the transmissive liquid crystal diffraction element and the circularly polarizing plate (where a retardation plate and a linearly polarizing plate are disposed in this order) will be described. In a case where right circularly polarized light is incident into the transmissive liquid crystal diffraction element, the incident right circularly polarized light is diffracted and emitted from the transmissive liquid crystal diffraction element. In addition, during the diffraction, the right circularly polarized light is converted into left circularly polarized light. The left circularly polarized light (that is, first-order light) that is diffracted by the transmissive liquid crystal diffraction element is converted into linearly polarized light by the retardation plate (¼ wave plate) of the circularly polarizing plate. The linearly polarized light converted by the retardation plate transmits through the linearly polarizing plate and is emitted.

Here, in a case where a part of light is not diffracted by the transmissive liquid crystal diffraction element, a part of right circularly polarized light incident into the transmissive liquid crystal diffraction element transmits through the transmissive liquid crystal diffraction element without being diffracted. In a case where the circularly polarizing plate is not provided, the right circularly polarized light that is not diffracted by the transmissive liquid crystal diffraction element linearly travels as it is. The right circularly polarized light that linearly travels is unnecessary depending on applications, which decreases the performance.

On the other hand, as described above, a configuration where the optical element includes the circularly polarizing plate can also be preferably used. In a case where the circularly polarizing plate is provided, right circularly polarized light (that is, zero-order light) that is not diffracted by the transmissive liquid crystal diffraction element is incident into and diffracted by the retardation plate of the circularly polarizing plate, is converted into linearly polarized light having a direction perpendicular to the above-described direction, and is incident into the linearly polarizing plate and absorbed. That is, the right circularly polarized light that is not diffracted by the transmissive liquid crystal diffraction element is absorbed by the circularly polarizing plate. Accordingly, transmission of the desired first-order light of left circularly polarized light is allowed, and the right circularly polarized light that is not diffracted can be reduced. Therefore, a decrease in performance by unnecessary light (zero-order light) can be suppressed.

In the configuration where the transmissive liquid crystal diffraction element according to the embodiment of the present invention and the circularly polarizing plate are used in combination, another optical element that is provided downstream of the circularly polarizing plate in a traveling direction of incidence light may also be used in combination.

For example, a retardation plate may be disposed downstream of the circularly polarizing plate. Specifically, a configuration where linearly polarized light transmitted through the circularly polarizing plate (where the retardation plate and the linearly polarizing plate are disposed in this order) is converted into circularly polarized light, elliptically polarized light, or linearly polarized light having a different polarization direction by the retardation plate that is disposed downstream of the circularly polarizing plate can also be preferably used. In addition, instead of the retardation plate, a depolarization layer that depolarizes the polarization state of light in at least a part of a wavelength range may be used. As the depolarization layer, for example, a high retardation film (having an in-plane retardation of 3000 nm or more) or a light scattering layer can be used. By controlling the polarization state of the light emitted from the circularly polarizing plate, the polarization state can be adjusted depending on applications.

In another example, an optical element that is provided downstream of the circularly polarizing plate to deflect light may be used. For example, by disposing the optical element such as a lens that deflects light downstream of the circularly polarizing plate, the traveling direction of light emitted from the circularly polarizing plate can be changed. By controlling the deflection direction of the light emitted from the circularly polarizing plate, the emission direction of light can be adjusted depending on applications.

Hereinabove, the transmissive liquid crystal diffraction element according to the embodiment of the present invention has been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of Transmissive Liquid Crystal Diffraction Element>
(Support)
A glass substrate was used as the support.
(Formation of Alignment Film)
The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

| Coating Liquid for Forming Alignment Film | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

—Material A for Photo-Alignment—

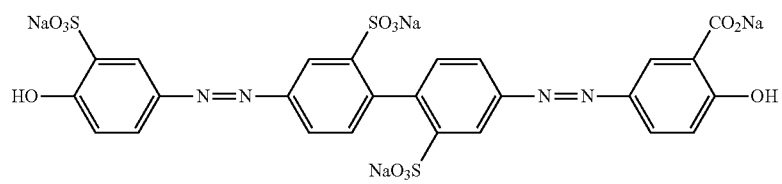

(Exposure of Alignment Film)

The alignment film was exposed using the exposure device shown in FIG. 13 to form an alignment film P-1 having an alignment pattern where an alignment axis rotated in one in-plane direction.

In the exposure device, a laser that emits laser light having a wavelength (325 nm) was used as the laser. The exposure amount of the interference light was 1000 mJ/cm². An intersecting angle (intersecting angle α) between the two laser beams was adjusted such that the single period Λ (the length over which the optical axis rotated by 180°) of an alignment pattern formed by interference of the two laser beams was 0.75 μm.

(Formation of Optically-Anisotropic Layer)

As a liquid crystal composition forming an optically-anisotropic layer A-1, the following liquid crystal composition A-1 was prepared.

| Liquid Crystal Composition A-1 | |
| --- | --- |
| Liquid crystal compound L-1 | 100.00 parts by mass |
| Polymerization initiator (IRGACURE OXE01, manufactured by BASF SE) | 1.00 part by mass |
| Leveling agent T-1 | 0.08 parts by mass |
| Methyl ethyl ketone | 1050.00 parts by mass |

Liquid crystal compound L-1 (including the following structures at a mass ratio shown on the right side)

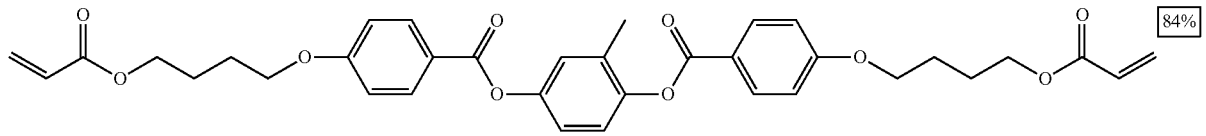

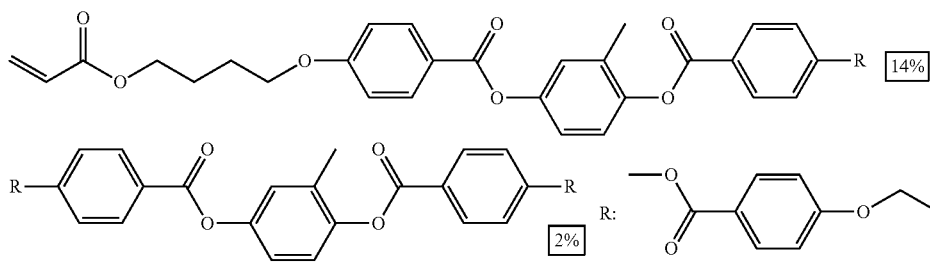

Leveling Agent T-1

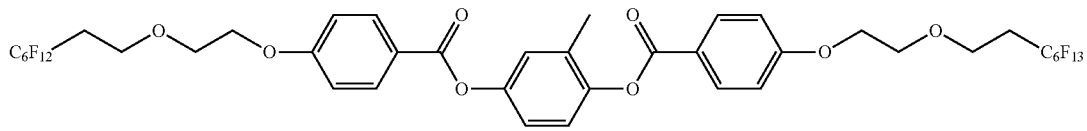

The optically-anisotropic layer was formed by applying multiple layers of the liquid crystal composition A-1 to the alignment film P-1. The application of the multiple layers refers to repetition of the following processes including: preparing a first liquid crystal immobilized layer by applying the liquid crystal composition A-1 for forming the first layer to the alignment film, heating the liquid crystal composition A-1, and irradiating the liquid crystal composition A-1 with ultraviolet light for curing; and preparing a second or subsequent liquid crystal immobilized layer by applying the liquid crystal composition A-1 for forming the second or subsequent layer to the formed liquid crystal immobilized layer, heating the liquid crystal composition A-1, and irradiating the liquid crystal composition A-1 with ultraviolet light for curing as described above. Even in a case where the liquid crystal layer was formed by the application of the multiple layers such that the total thickness of the optically-anisotropic layer was large, the alignment direction of the alignment film was reflected from a lower surface of the optically-anisotropic layer to an upper surface thereof.

Regarding the first liquid crystal layer, the liquid crystal composition A-1 was applied to the alignment film P-1 to form a coating film, the coating film was heated to 80° C. using a hot plate, the coating film was irradiated with ultraviolet light having a wavelength of 365 nm at an irradiation dose of 300 mJ/cm² using a high-pressure mercury lamp in a nitrogen atmosphere. As a result, the alignment of the liquid crystal compound was immobilized.

Regarding the second or subsequent liquid crystal immobilized layer, the composition was applied to the first liquid crystal layer, and the applied composition was heated and irradiated with ultraviolet light for curing under the same conditions as described above. As a result, a liquid crystal immobilized layer was prepared. This way, by repeating the application multiple times until the total thickness reached a desired film thickness, an optically-anisotropic layer A-1 was obtained, and a transmissive liquid crystal diffraction element was prepared.

A complex refractive index of the cured layer of the liquid crystal composition A-1 was obtained by applying the liquid crystal composition A-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value and the film thickness of the liquid crystal immobilized layer. Δn can be calculated by dividing the retardation value by the film thickness. The retardation value was measured at a desired wavelength using Axoscan (manufactured by Axometrix Inc.), and the film thickness was measured using a scanning electron microscope (SEM).

Finally, in the optically-anisotropic layer, $\Delta n_{550} \times$ thickness (Re(550)) of the liquid crystals was 275 nm, and it was verified using a polarization microscope that periodic alignment occurred. In addition, the twisted angle in the thickness direction of the optically-anisotropic layer was 0° over the entire in-plane region. Hereinafter, unless specified otherwise, "$\Delta n_{550} \times d$" and the like were measured as described above.

Figure 18:
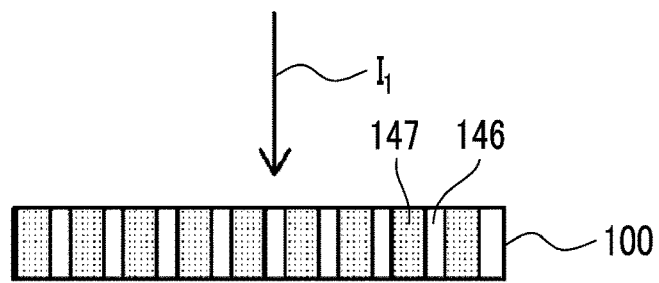
FIG. 18 is a diagram showing a configuration of a transmissive liquid crystal diffraction element according to Comparative Example.

In a case where a cross-section of the prepared transmissive liquid crystal diffraction element was observed with an SEM, bright portions and dark portions were observed. The tilt angle of the dark portion in the optically-anisotropic layer A-1 was 0° (refer to FIG. 18).

Comparative Example 2

An optically-anisotropic layer A-2 was formed using the same method as that of the optically-anisotropic layer A-1, except that, during the exposure of the alignment film, an intersecting angle (intersecting angle α) between the two beams was adjusted such that the single period Λ (the length over which the optical axis rotated by 180°) of an alignment pattern formed by interference of two laser beams was 1.5 μm.

An optically-anisotropic layer A-3 was formed using the same method as that of the optically-anisotropic layer A-2, except that, during the exposure of the alignment film, an axial angle of the two λ/4 plates 72A and 72B in the exposure device rotated by 90°.

The optically-anisotropic layer A-2 and the optically-anisotropic layer A-3 were laminated to prepare a transmissive liquid crystal diffraction element. During the lamination, the directions of the liquid crystal alignment patterns derived from the liquid crystal compounds in the optically-anisotropic layer A-2 and the optically-anisotropic layer A-3 were matched to each other. The optically-anisotropic layer A-2 and the optically-anisotropic layer A-3 were laminated such that the rotation directions of the optical axes in the liquid crystal alignment patterns were the same. In addition, the optically-anisotropic layer A-2 and the optically-anisotropic layer A-3 were adjacent to each other. In addition, during the lamination, one optically-anisotropic layer was peeled off from the support and was laminated on another optically-anisotropic layer. This point can be applied the following Comparative Examples and Examples.

Figure 19:
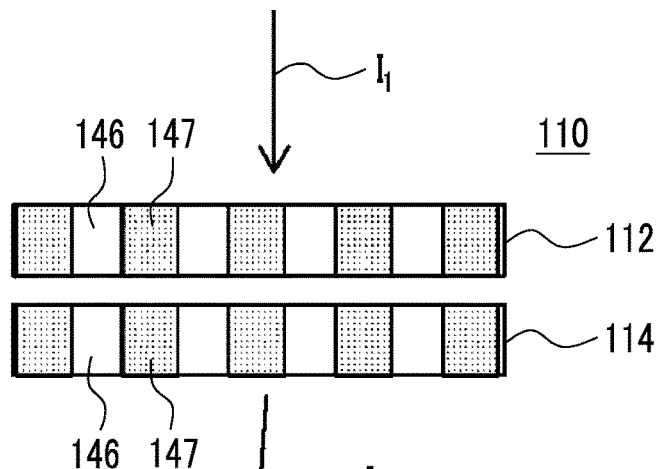
FIG. 19 is a diagram showing the configuration of the transmissive liquid crystal diffraction element according to Comparative Example.

In a case where a cross-section of the prepared transmissive liquid crystal diffraction element was observed with an SEM, bright portions and dark portions were observed. The tilt angles of the dark portions in both of the optically-anisotropic layer A-2 and the optically-anisotropic layer A-3 were 0°. That is, the tilt angles in the plurality of optically-anisotropic layers did not change in the thickness direction (refer to FIG. 19).

Comparative Example 3

The two optically-anisotropic layers A-2 were laminated as follows to prepare a transmissive liquid crystal diffraction element.

During the lamination, the directions of the liquid crystal alignment patterns derived from the liquid crystal compounds in the two optically-anisotropic layers A-2 were matched to each other. In addition, the optically-anisotropic layers were laminated such that the rotation direction of the optical axis in the liquid crystal alignment pattern of one optically-anisotropic layer and the rotation direction of the optical axis in the liquid crystal alignment pattern of the other optically-anisotropic layer. In addition, the two optically-anisotropic layers A-2 were adjacent to each other.

Figure 20:
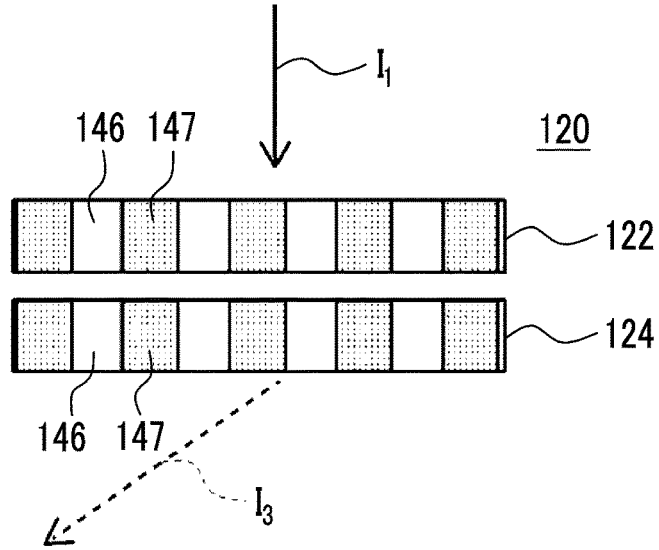
FIG. 20 is a diagram showing the configuration of the transmissive liquid crystal diffraction element according to Comparative Example.

In a case where a cross-section of the prepared transmissive liquid crystal diffraction element was observed with an SEM, bright portions and dark portions were observed. The tilt angles of the dark portions in both of the optically-anisotropic layers A-2 were 0°. That is, the tilt angles in the plurality of optically-anisotropic layers did not change in the thickness direction (refer to FIG. 20).

Example 1

A liquid crystal composition B-1 was obtained by adding 0.10 parts by mass of the following chiral agent C-2 to the liquid crystal composition A-1.
Chiral Agent C-2

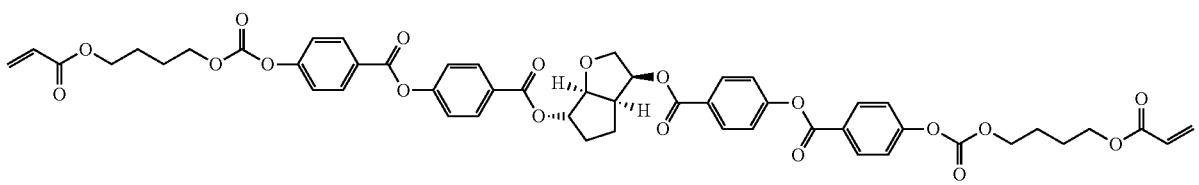

An optically-anisotropic layer B-1 was formed using the same method as that of the optically-anisotropic layer A-2, except that the film thickness of the optically-anisotropic layer was adjusted using the liquid crystal composition B-1 instead of the liquid crystal composition A-1. The twisted angle in the thickness direction of the optically-anisotropic layer B-1 was right-twisted and 40° in a plane.

The optically-anisotropic layer A-2 and the optically-anisotropic layer B-1 were laminated to prepare a transmissive liquid crystal diffraction element.

During the lamination, surfaces of the optically-anisotropic layers facing the substrate were bonded to each other, and the directions of the liquid crystal alignment patterns derived from the liquid crystal compounds in the optically-anisotropic layer A-2 and the optically-anisotropic layer B-1 were matched to each other. In addition, the optically-anisotropic layers were laminated such that the rotation direction of the optical axis in the liquid crystal alignment pattern of one optically-anisotropic layer and the rotation direction of the optical axis in the liquid crystal alignment pattern of the other optically-anisotropic layer. In addition, the optically-anisotropic layer A-2 and the optically-anisotropic layer B-1 were adjacent to each other.

In a case where a cross-section of the prepared transmissive liquid crystal diffraction element was observed with an SEM, bright portions and dark portions were observed. The tilt angle of the dark portion in the optically-anisotropic layer A-2 was 0°. On the other hand, the tilt angle of the dark portion in the optically-anisotropic layer B-1 was 12°. That is, the tilt angles in the plurality of optically-anisotropic layers changed in order.

Example 2

A liquid crystal composition B-2a was prepared by changing the amount of the chiral agent C-2 in the liquid crystal composition B-1 was changed to 0.21 parts by mass.

The following liquid crystal composition B-2b was prepared.

| Liquid Crystal Composition B-2b | |
|---|---|
| Liquid crystal compound L-1 | 100.00 parts by mass |
| Chiral agent C-1 | 0.37 parts by mass |
| Polymerization initiator (IRGACURE OXE01, manufactured by BASF SE) | 1.00 part by mass |
| Leveling agent T-1 | 0.08 parts by mass |
| Methyl ethyl ketone | 1050.00 parts by mass |

Chiral Agent C-1

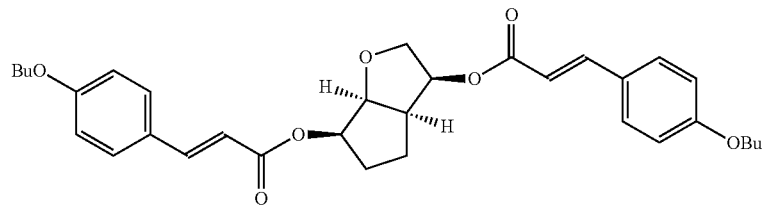

A first region in an optically-anisotropic layer B-2 was formed using the same method as that of the optically-anisotropic layer A-2, except that the film thickness of the optically-anisotropic layer was adjusted using the liquid crystal composition B-2a. The twisted angle in the thickness direction of the first region of the optically-anisotropic layer B-2 was right-twisted and 80° in a plane.

Next, a second region was formed on the first region of the optically-anisotropic layer B-2 through the same procedure, except that the liquid crystal composition B-2b was used. The twisted angle in the thickness direction of the second region of the optically-anisotropic layer B-2 was left-twisted and 80° in a plane.

As a result, the optically-anisotropic layer B-2 including the two regions was formed.

The optically-anisotropic layer B-1 and the optically-anisotropic layer B-2 were laminated to prepare a transmissive liquid crystal diffraction element.

During the lamination, surfaces of the optically-anisotropic layers facing the substrate were bonded to each other, and the directions of the liquid crystal alignment patterns derived from the liquid crystal compounds in the optically-anisotropic layer B-1 and the optically-anisotropic layer B-2 were matched to each other. In addition, the optically-anisotropic layers were laminated such that the rotation direction of the optical axis in the liquid crystal alignment pattern of one optically-anisotropic layer and the rotation direction of the optical axis in the liquid crystal alignment pattern of the other optically-anisotropic layer. In addition, the optically-anisotropic layer B-1 and the optically-anisotropic layer B-2 were adjacent to each other.

In a case where a cross-section of the prepared transmissive liquid crystal diffraction element was observed with an SEM, bright portions and dark portions were observed. The tilt angle of the dark portion in the optically-anisotropic layer B-1 was 12°. On the other hand, the dark portions in the two regions of the optically-anisotropic layer B-2 were tilted in different directions, and each of the dark portions had one inflection point of tilt angle. The average tilt angle of the dark portion of the optically-anisotropic layer B-2 was 0°. That is, the tilt angles in the plurality of optically-anisotropic layers changed in order.

Example 3

A liquid crystal composition B-3a was prepared by changing the amount of the chiral agent C-2 in the liquid crystal composition B-1 was changed to 0.37 parts by mass. A liquid crystal composition B-3b was prepared by changing the amount of the chiral agent C-2 in the liquid crystal composition B-1 was changed to 0.09 parts by mass. A liquid crystal composition B-3c was prepared by changing the amount of the chiral agent C-1 in the liquid crystal composition B-2b was changed to 0.39 parts by mass.

A first region in an optically-anisotropic layer B-3 was formed using the same method as that of the optically-anisotropic layer A-2, except that the film thickness of the optically-anisotropic layer was adjusted using the liquid crystal composition B-3a. The twisted angle in the thickness direction of the first region of the optically-anisotropic layer B-3 was right-twisted and 100° in a plane.

Next, a second region was formed on the first region of the optically-anisotropic layer B-3 through the same procedure, except that the liquid crystal composition B-3b was used. The twisted angle in the thickness direction of the second region of the optically-anisotropic layer B-3 was right-twisted and 46° in a plane.

Next, a third region was formed on the second region of the optically-anisotropic layer B-3 through the same procedure, except that the liquid crystal composition B-3c was used. The twisted angle in the thickness direction of the third region of the optically-anisotropic layer B-3 was left-twisted and 59° in a plane.

As a result, the optically-anisotropic layer B-3 including the three regions was formed.

A liquid crystal composition B-4a was prepared by changing the amount of the chiral agent C-1 in the liquid crystal composition B-2b was changed to 0.27 parts by mass. A liquid crystal composition B-4b was prepared by changing the amount of the chiral agent C-1 in the liquid crystal composition B-2b was changed to 0.10 parts by mass. A liquid crystal composition B-4c was prepared by changing the amount of the chiral agent C-1 in the liquid crystal composition B-2b was changed to 0.8 parts by mass.

A first region in an optically-anisotropic layer B-4 was formed using the same method as that of the optically-anisotropic layer A-2, except that the film thickness of the optically-anisotropic layer was adjusted using the liquid crystal composition B-4a. The twisted angle in the thickness direction of the first region of the optically-anisotropic layer B-4 was left-twisted and 36° in a plane.

Next, a second region was formed on the first region of the optically-anisotropic layer B-4 through the same procedure, except that the liquid crystal composition B-4b was used. The twisted angle in the thickness direction of the second region of the optically-anisotropic layer B-4 was left-twisted and 33° in a plane.

Next, a third region was formed on the second region of the optically-anisotropic layer B-4 through the same procedure, except that the liquid crystal composition B-4c was used. The twisted angle in the thickness direction of the third region of the optically-anisotropic layer B-4 was left-twisted and 192° in a plane.

As a result, the optically-anisotropic layer B-4 including the three regions was formed.

The optically-anisotropic layer B-3 and the optically-anisotropic layer B-4 were laminated to prepare a transmissive liquid crystal diffraction element. During the lamination, surfaces of the optically-anisotropic layer B-3 and the optically-anisotropic layer B-4 facing the substrate were bonded to each other.

During the lamination, the directions of the liquid crystal alignment patterns derived from the liquid crystal compounds in the optically-anisotropic layer B-3 and the optically-anisotropic layer B-4 were matched to each other. In addition, the optically-anisotropic layers were laminated such that the rotation direction of the optical axis in the liquid crystal alignment pattern of one optically-anisotropic layer and the rotation direction of the optical axis in the liquid crystal alignment pattern of the other optically-anisotropic layer. In addition, the optically-anisotropic layer B-3 and the optically-anisotropic layer B-4 were adjacent to each other.

In a case where a cross-section of the prepared transmissive liquid crystal diffraction element was observed with an SEM, bright portions and dark portions were observed. The dark portions in the three regions of the optically-anisotropic layer B-3 were tilted at different angles, and each of the dark portions had two inflection points of tilt angle. The average tilt angle of the dark portion of the optically-anisotropic layer B-3 was 8°. In addition, the dark portions in the three regions of the optically-anisotropic layer B-4 were tilted at different angles, and each of the dark portions had two inflection points of tilt angle. The average tilt angle of the dark portion of the optically-anisotropic layer B-4 was 18°. That is, the tilt angles in the plurality of optically-anisotropic layers changed in order.

Example 4

(Exposure of Alignment Film)

After forming an alignment film according to the same procedure as that of Comparative Example 1, the alignment film was exposed using the exposure device shown in FIG. 17 to form an alignment film P-2 having a concentric circular alignment pattern. In the exposure device, a laser that emits laser light having a wavelength (325 nm) was used as the laser. The exposure amount of the interference light was 1000 mJ/cm$^2$. By using the exposure device shown in FIG. 17, the single period of the alignment pattern gradually decreased from the center toward the outer direction.

An optically-anisotropic layer C-1 was obtained using the same method as that of the optically-anisotropic layer B-3, except that the alignment film P-2 was used instead of the alignment film P-1.

Likewise, an optically-anisotropic layer C-2 was obtained using the same method as that of the optically-anisotropic layer B-4, except that the alignment film P-2 was used instead of the alignment film P-1.

It was verified using a polarization microscope that the prepared optically-anisotropic layer C-1 had a periodic alignment pattern having a concentric circular shape (radial shape) as shown in FIG. 16. In the liquid crystal alignment pattern of the optically-anisotropic layer C-1, regarding the single period over which the optical axis of the liquid crystal compound rotated by 180°, the single period of a portion at a distance of about 2 mm from the center was m, and the single period of a portion at a distance of 20 mm from the center was 1.5 μm. This way, the single period decreased toward the outer direction.

In a case where the surface of the optically-anisotropic layer C-2 was observed with a polarization microscope, the optically-anisotropic layer C-2 had the same liquid crystal alignment pattern as the optically-anisotropic layer C-1.

The optically-anisotropic layer C-1 and the optically-anisotropic layer C-2 were laminated to prepare a transmissive liquid crystal diffraction element. During the lamination, surfaces of the optically-anisotropic layer C-1 and the optically-anisotropic layer C-2 facing the substrate were bonded to each other.

During the lamination, the directions of the liquid crystal alignment patterns derived from the liquid crystal compounds in the optically-anisotropic layer C-1 and the optically-anisotropic layer C-2 were matched to each other. In addition, the optically-anisotropic layers were laminated such that the rotation direction of the optical axis in the liquid crystal alignment pattern of one optically-anisotropic layer and the rotation direction of the optical axis in the liquid crystal alignment pattern of the other optically-anisotropic layer. In addition, the optically-anisotropic layer C-1 and the optically-anisotropic layer C-2 were adjacent to each other.

In a case where a cross-section of the prepared transmissive liquid crystal diffraction element was observed with an SEM, bright portions and dark portions were observed. The dark portions in the three regions of the optically-anisotropic layer C-1 were tilted at different angles, and each of the dark portions had two inflection points of tilt angle. The single period of a position of the optically-anisotropic layer C-1 at a distance of 20 mm from the center was 1.5 μm, and the average tilt angle of the dark portion was 8°. In addition, the dark portions in the three regions of the optically-anisotropic layer C-2 were tilted at different angles, and each of the dark portions had two inflection points of tilt angle. The single period of a position of the optically-anisotropic layer C-2 at a distance of 20 mm from the center was 1.5 μm, and the average tilt angle of the dark portion was 18°. That is, the tilt angles in the plurality of optically-anisotropic layers changed in order.

Example 5

As the liquid crystal composition, the following liquid crystal composition C-3a was prepared.

| Liquid Crystal Composition C-3a | |
| --- | --- |
| Liquid crystal compound L-1 | 100.00 parts by mass |
| Chiral agent C-3 | 0.23 parts by mass |
| Chiral agent C-4 | 0.82 parts by mass |
| Polymerization initiator (IRGACURE OXE01, manufactured by BASF SE) | 1.00 part by mass |
| Leveling agent T-1 | 0.08 parts by mass |
| Methyl ethyl ketone | 1050.00 parts by mass |

Chiral Agent C-3

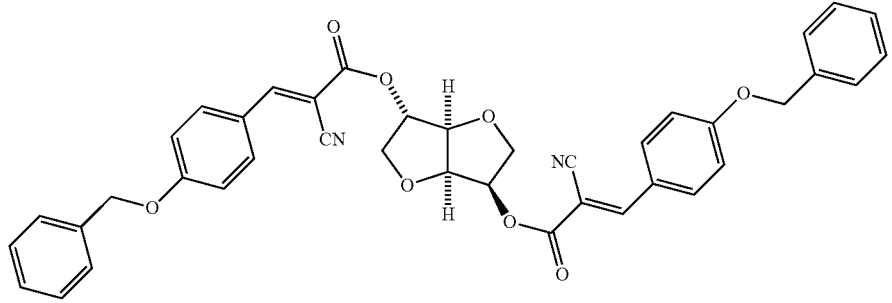

Chiral Agent C-4

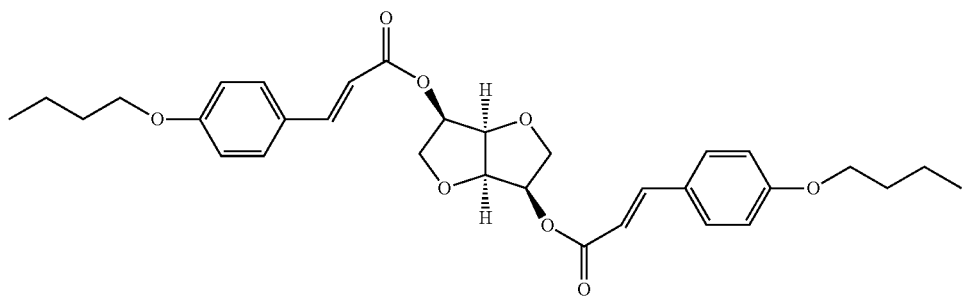 [SMILES: CCCCOc1ccc(/C=C/C(=O)O[C@@H]2CO[C@H]3[C@@H]2OC[C@H]3OC(=O)/C=C/c2ccc(OCCCC)cc2)cc1]

A liquid crystal composition C-3b and a liquid crystal composition C-3c were adjusted by appropriately adjusting the amounts of the chiral agent C-3 and the chiral agent C-4 in the liquid crystal composition C-3a.

First, a first region was formed by applying multiple layers of the liquid crystal composition C-3a to the alignment film P-2.

First, in order to form the first liquid crystal immobilized layer, the liquid crystal composition C-3a was applied to the alignment film P-2, and the coating film was heated to 80° C. on a hot plate. Next, the coating film was irradiated with ultraviolet light having a wavelength of 365 nm using a LED-UV exposure device. At this time, the coating film was irradiated while changing the irradiation dose of ultraviolet light in a plane. Specifically, the coating film was irradiated by changing the irradiation dose in a plane such that the irradiation dose increased from the center portion toward an end part. Next, the coating film heated on a hot plate at 80° C. was irradiated with ultraviolet light having a wavelength of 365 nm at an irradiation dose of 300 mJ/cm² using a high-pressure mercury lamp in a nitrogen atmosphere. As a result, the alignment of the liquid crystal compound was immobilized.

Regarding the second or subsequent liquid crystal layer, the composition was applied to the liquid crystal immobilized layer, and then a liquid crystal immobilized layer was prepared under the same conditions as described above. This way, by repeating the application multiple times until the film thickness reached a desired thickness, a first region of an optically-anisotropic layer C-3 was formed.

Regarding the twisted angle in the thickness direction of the first region of the optically-anisotropic layer C-3, the twisted angle at a position at a distance of about 2 mm from the center was right-twisted and 86°, the twisted angle at a position at a distance of about 20 mm from the center was right-twisted and 100°, and the twisted angle increased toward the outer direction.

Next, a second region was formed on the first region of the optically-anisotropic layer C-3 through the same procedure, except that the liquid crystal composition C-3b was used. Regarding the twisted angle in the thickness direction of the second region of the optically-anisotropic layer C-3, the twisted angle at a position at a distance of about 2 mm from the center was right-twisted and 13°, the twisted angle at a position at a distance of about 20 mm from the center was right-twisted and 46°, and the twisted angle increased toward the outer direction.

Next, a third region was formed on the second region of the optically-anisotropic layer C-3 through the same procedure, except that the liquid crystal composition C-3c was used. Regarding the twisted angle in the thickness direction of the third region of the optically-anisotropic layer C-3, the twisted angle at a position at a distance of about 2 mm from the center was left-twisted and 76°, the twisted angle at a position at a distance of about 20 mm from the center was left-twisted and 59°, and the twisted angle decreased toward the outer direction.

As a result, the optically-anisotropic layer C-3 including the three regions was formed.

It was verified using a polarization microscope that the prepared optically-anisotropic layer C-3 had a periodic alignment pattern having a concentric circular shape (radial shape) as shown in FIG. 16. In the liquid crystal alignment pattern of the optically-anisotropic layer C-3, regarding the single period over which the optical axis of the liquid crystal compound rotated by 180°, the single period of a portion at a distance of about 2 mm from the center was m, and the single period of a portion at a distance of 20 mm from the center was 1 µm. This way, the single period decreased toward the outer direction.

A liquid crystal composition C-4a, a liquid crystal composition C-4b, and a liquid crystal composition C-4c were adjusted by appropriately adjusting the amounts of the chiral agent C-3 and the chiral agent C-4 in the liquid crystal composition C-3a.

A first region in an optically-anisotropic layer C-4 was formed using the same method as that of the first optically-anisotropic layer C-3, except that the film thickness of the optically-anisotropic layer was adjusted using the liquid crystal composition C-4a. Regarding the twisted angle in the thickness direction of the first region of the optically-anisotropic layer C-4, the twisted angle at a position at a distance of about 2 mm from the center was right-twisted and 54°, the twisted angle at a position at a distance of about 20 mm from the center was left-twisted and 36°, and the twisted angle changed toward the outer direction.

Next, a second region was formed on the first region of the optically-anisotropic layer C-4 through the same procedure, except that the liquid crystal composition C-4b was used. Regarding the twisted angle in the thickness direction of the second region of the optically-anisotropic layer C-4, the twisted angle at a position at a distance of about 2 mm from the center was right-twisted and 145°, the twisted angle at a position at a distance of about 20 mm from the center was left-twisted and 33°, and the twisted angle changed toward the outer direction.

Next, a third region was formed on the second region of the optically-anisotropic layer C-4 through the same procedure, except that the liquid crystal composition C-4c was used. Regarding the twisted angle in the thickness direction of the third region of the optically-anisotropic layer C-4, the twisted angle at a position at a distance of about 2 mm from the center was left-twisted and 41°, the twisted angle at a position at a distance of about 20 mm from the center was left-twisted and 192°, and the twisted angle increased toward the outer direction.

As a result, the optically-anisotropic layer C-4 including the three regions was formed.

In a case where the surface of the optically-anisotropic layer C-4 was observed with a polarization microscope, the optically-anisotropic layer C-4 had the same liquid crystal alignment pattern as the optically-anisotropic layer C-3.

The optically-anisotropic layer C-3 and the optically-anisotropic layer C-4 were laminated to prepare a transmissive liquid crystal diffraction element. During the lamination, surfaces of the optically-anisotropic layer C-3 and the optically-anisotropic layer C-4 facing the substrate were bonded to each other.

During the lamination, the directions of the liquid crystal alignment patterns derived from the liquid crystal compounds in the optically-anisotropic layer C-3 and the optically-anisotropic layer C-4 were matched to each other. In addition, the optically-anisotropic layers were laminated such that the rotation direction of the optical axis in the liquid crystal alignment pattern of one optically-anisotropic layer and the rotation direction of the optical axis in the liquid crystal alignment pattern of the other optically-anisotropic layer. In addition, the optically-anisotropic layer C-3 and the optically-anisotropic layer C-4 were adjacent to each other.

In a case where a cross-section of the prepared transmissive liquid crystal diffraction element was observed with an SEM, bright portions and dark portions were observed. The dark portions in the three regions of the optically-anisotropic layer C-3 were tilted at different angles, and each of the dark portions had two inflection points of tilt angle. The single period of a position of the optically-anisotropic layer C-3 at a distance of 20 mm from the center was 1.5 µm, and the average tilt angle of the dark portion was 8°. In addition, the dark portions in the three regions of the optically-anisotropic layer C-4 were tilted at different angles, and each of the dark portions had two inflection points of tilt angle. The single period of a position of the optically-anisotropic layer C-4 at a distance of 20 mm from the center was 1.5 µm, and the average tilt angle of the dark portion was 18°. That is, the tilt angles in the plurality of optically-anisotropic layers changed in order.

In each of the optically-anisotropic layer C-3 and the optically-anisotropic layer C-4, the tilt angle of the dark portion gradually changed from the center toward the outer direction.

Evaluation

<Evaluation of Diffraction Angle and Diffraction Efficiency>

In a case where light was incident into the prepared transmissive liquid crystal diffraction element from the front (direction with an angle of 0° with respect to the normal line), the diffraction angle and the diffraction efficiency of emitted light were evaluated.

Specifically, laser light components having output central wavelengths of 450 nm, 532 nm, and 650 nm were irradiated to be vertically incident into the prepared transmissive liquid crystal diffraction element from a light source. In the emitted light, the angle of diffracted light (first-order light) diffracted by the transmissive liquid crystal diffraction element was measured. In addition, the intensities of diffracted light (first-order light) diffracted in a desired direction, zero-order light (emitted in the same direction as incidence light) emitted in the other directions, and negative first-order light (light diffracted in a −θ direction in a case where the diffraction angle of first-order light with respect to zero-order light was represented by θ) were measured using a photodetector, the diffraction efficiency at each of the wavelengths was calculated from the following expression, and the average value thereof was obtained as an evaluation value.

Diffraction Efficiency=First-Order Light/(First-Order Light+Zero-Order Light+(Negative First-Order Light))

In each of the transmissive liquid crystal diffraction elements, the optically-anisotropic layers on the incidence side and the emission side of light are as shown in Table 1. In Table 1, only reference numerals of the optically-anisotropic layers were shown.

The diffraction angle with respect to the incidence light of 650 nm was evaluated based on the following standards. In Examples 4 and 5 having the concentric circular liquid crystal alignment pattern, in a case where light was incident into the outer position at a distance of 20 mm from the center, the diffraction angle was evaluated.

A: the diffraction angle was 500 or more
B: the diffraction angle was 300 or more and less than 500
C: the diffraction angle was less than 300

The diffraction efficiency was evaluated based on the following standards. In Examples 4 and 5 having the concentric circular liquid crystal alignment pattern, the average value of the diffraction efficiency in a case where light was incident into the outer position at a distance of 20 mm from the center and the diffraction angle in a case where light was incident into the outer position at a distance of 2 mm from the center was obtained as an evaluation value.

AA: the diffraction efficiency was 93% or more.
A: the diffraction efficiency was 90% or more and less than 93%.
B: the diffraction efficiency is 85% or more and less than 90%.
C: the diffraction efficiency is 75% or more and less than 85%.
D: the diffraction efficiency was less than 75%.

Laser light was caused to be vertically incident into the circularly polarizing plate corresponding to the wavelength of the laser light to be converted into circularly polarized light, the circularly polarized light was incident into the prepared transmissive liquid crystal diffraction element, and the evaluation was performed.

The results are shown in Table 1. In Table 1, the rotation direction of the optical axis is the rotation direction of the optical axis in the liquid crystal alignment pattern of the optically-anisotropic layer, and is the rotation direction of the optical axis in a view from a direction in which the rotation direction of the optical axis in the optically-anisotropic layer A-1 according to Comparative Example 1 was right-rotating with respect to the incidence side of light.

It can be seen from Table 1 that, in Example according to the present invention, the diffraction angle was larger and the diffraction efficiency was higher than those of Comparative Examples.

It can be seen from Comparative Example 1 that, by reducing the single period of the liquid crystal alignment pattern, the diffraction angle can be increased, but the diffraction efficiency decreases.

It can be seen from Comparative Example 2 that, in a case where the optically-anisotropic layers where the rotation directions of the optical axes in the liquid crystal alignment patterns are the same are laminated, the diffraction angle decreases.

It can be seen from Comparative Example 3 that, in a case where the optically-anisotropic layers where the tilt angles of the dark portions are the same are laminated, the diffraction efficiency decreases.

It can be seen from a comparison between Examples 1 to 3 that it is preferable that the dark portion in the optically-anisotropic layer has an inflection point of angle.

It can be seen from a comparison between Example 4 and Example 5 that it is preferable that, in a case of the optically-anisotropic layer C-4 has the concentric circular liquid crystal alignment pattern, the tilt angle of the dark portion gradually changes from the center toward the outer direction.

As can be seen from the above results, the effects of the present invention are obvious.

EXPLANATION OF REFERENCES 10, 100, 110, 120: transmissive liquid crystal diffraction element

TABLE 1

| | Optically-Anisotropic Layer on Incidence Side | | Tilt Angle of Dark Portion (°) | Number of Inflection Points | Optically-Anisotropic Layer on Emission Side | | Tilt Angle of Dark Portion (°) | Number of Inflection Points | Liquid Crystal Alignment Pattern | Evaluation | |
|---|---|---|---|---|---|---|---|---|---|---|---|
| | Kind | Rotation Direction | | | Kind | Rotation Direction | | | | Diffraction Angle | Diffraction Efficiency |
| Comparative Example 1 | A-1 | Right-Rotating | 0 | 0 | — | — | — | — | One In-Plane Direction | A | D |
| Comparative Example 2 | A-2 | Right-Rotating | 0 | 0 | A-3 | Right-Rotating | 0 | 0 | One In-Plane Direction | C | — |
| Comparative Example 3 | A-2 | Right-Rotating | 0 | 0 | A-2 | Left-Rotating | 0 | 0 | One In-Plane Direction | A | D |
| Example 1 | A-2 | Right-Rotating | 0 | 0 | B-1 | Left-Rotating | 12 | 0 | One In-Plane Direction | A | B |
| Example 2 | B-2 | Right-Rotating | 0 | 1 | B-1 | Left-Rotating | 12 | 0 | One In-Plane Direction | A | A |
| Example 3 | B-3 | Right-Rotating | 8 | 2 | B-4 | Left-Rotating | 18 | 2 | One In-Plane Direction | A | AA |
| Example 4 | C-1 | Right-Rotating | 8 | 2 | C-2 | Left-Rotating | 18 | 2 | Concentric Circular | A | A |
| Example 5 | C-3 | Right-Rotating | 8 | 2 | C-4 | Left-Rotating | 18 | 2 | Concentric Circular | A | AA |

30: support
32: alignment film
36, 36b to 36f, 37, 37b, 37d, 112, 114, 122, 124: optically-anisotropic layer
40: liquid crystal compound
40c: rod-like liquid crystal compound
40d: disk-like liquid crystal compound
40A: optical axis
42, 42b: rod-like liquid crystal layer
44, 44b: disk-like liquid crystal layer
46, 146: bright portion
47, 147: dark portion
48a to 48e: region
60, 80: exposure device
62, 82: laser
64, 84: light source
65: λ/2 plate
68: beam splitter
70A, 70B, 90A, 90B: mirror
72A: 72B, 96: λ/4 plate
86, 94: polarization beam splitter
92: lens
A: single period
D, $A_1$ to $A_3$: arrangement axis
R: region
M: laser light
MA, MB: beam
MP: P polarized light
MS: S polarized light
$P_0$: linearly polarized light
$P_R$: right circularly polarized light
$P_L$: left circularly polarized light
a: intersecting angle
$L_1$, $L_2$, $L_4$, $L_5$, $I_1$ to $I_4$: light

What is claimed is:

1. A transmissive liquid crystal diffraction element comprising:
a plurality of optically-anisotropic layers that are formed of a liquid crystal composition including a liquid crystal compound in a thickness direction,
wherein the optically-anisotropic layer has a liquid crystal alignment pattern in which a direction of an optical axis derived from the liquid crystal compound changes while continuously rotating in at least one in-plane direction,
the one in-plane directions of the plurality of optically-anisotropic layers are parallel to each other,
in at least two optically-anisotropic layers adjacent to each other among the plurality of optically-anisotropic layers, a rotation direction of the optical axis in the liquid crystal alignment pattern of one optically-anisotropic layer and a rotation direction of the optical axis in the liquid crystal alignment pattern of the other optically-anisotropic layer are opposite to each other,
in cross-sectional images of the plurality of optically-anisotropic layers obtained by observing cross-sections taken in a thickness direction parallel to the one in-plane direction with a scanning electron microscope, the plurality of optically-anisotropic layers have bright portions and dark portions extending from one surface to another surface,
tilt angles of the dark portions of the plurality of optically-anisotropic layers change in order in the thickness direction,
in at least one of the plurality of optically-anisotropic layers, the liquid crystal compound is twisted and aligned in the thickness direction, and twisted angle in the thickness direction is less than 360 degrees, and
an in-plane retardation Δn×d of each of the plurality of optically-anisotropic layers satisfies $0.7 \times (\lambda/2)$ nm ≤ Δn λ × d ≤ $1.3 \times (\lambda/2)$ nm, where λ represents a wavelength of an incident light.

2. The transmissive liquid crystal diffraction element according to claim 1,
wherein tilt directions of the dark portions of the plurality of optically-anisotropic layers are the same as each other.

3. The transmissive liquid crystal diffraction element according to claim 1,
wherein the dark portions of the plurality of optically-anisotropic layers consist of dark portions perpendicular to a main surface of the optically-anisotropic layers and dark portions tilted in the one in-plane direction.

4. The transmissive liquid crystal diffraction element according to claim 1,
wherein the liquid crystal compound is a rod-like liquid crystal compound or a disk-like liquid crystal compound.

5. The transmissive liquid crystal diffraction element according to claim 1,
wherein at least one of the plurality of optically-anisotropic layers has a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated.

6. The transmissive liquid crystal diffraction element according to claim 1,
wherein in at least one of the plurality of optically-anisotropic layers, the dark portion has one or more inflection points of angle.

7. The transmissive liquid crystal diffraction element according to claim 1,
wherein the liquid crystal alignment pattern of the optically-anisotropic layer is a concentric circular pattern having a concentric circular shape where the one in-plane direction in which the direction of the optical axis derived from the liquid crystal compound changes while continuously rotating moves from an inner side toward an outer side.

8. The transmissive liquid crystal diffraction element according to claim 1,
wherein in at least one of the plurality of optically-anisotropic layers, the tilt angles of the dark portions gradually change in the one in-plane direction.

9. The transmissive liquid crystal diffraction element according to claim 1,
wherein one of the two optically-anisotropic layers adjacent to each other diffracts incident circularly polarized light and converts the rotation direction to another rotation direction opposite to the rotation direction, the circularly polarized light in which the rotation direction is converted to the another rotation direction is incident on another of the two optically anisotropic layer adjacent to each other, and the another of the two optically anisotropic layer adjacent to each other diffracts the circularly polarized light and converts the another direction to the rotation direction.

* * * * *